(12) United States Patent
Kang et al.

(10) Patent No.: US 9,367,058 B2
(45) Date of Patent: Jun. 14, 2016

(54) NETWORK SYSTEM AND METHOD FOR CONTROLLING SAME

(75) Inventors: Seonghwan Kang, Changwon-si (KR); Kangwoon Cheon, Changwon-si (KR); Minjin Oh, Changwon-si (KR); Jongmi Choi, Changwon-si (KR); Chulgon Tak, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 276 days.

(21) Appl. No.: 14/001,784

(22) PCT Filed: Apr. 16, 2012

(86) PCT No.: PCT/KR2012/002885
§ 371 (c)(1),
(2), (4) Date: Aug. 27, 2013

(87) PCT Pub. No.: WO2012/144776
PCT Pub. Date: Oct. 26, 2012

(65) Prior Publication Data
US 2013/0346300 A1 Dec. 26, 2013

(30) Foreign Application Priority Data

| Apr. 18, 2011 | (KR) | 10-2011-0035881 |
| Apr. 21, 2011 | (KR) | 10-2011-0037501 |
| Apr. 21, 2011 | (KR) | 10-2011-0037502 |
| Aug. 1, 2011  | (KR) | 10-2011-0076388 |

(51) Int. Cl.
*G05B 15/02* (2006.01)
*G06Q 20/22* (2012.01)
*H04L 12/28* (2006.01)
*D06F 33/02* (2006.01)
*G07F 17/20* (2006.01)

(52) U.S. Cl.
CPC ............... *G05B 15/02* (2013.01); *D06F 33/02* (2013.01); *G06Q 20/22* (2013.01); *G07F 17/20* (2013.01); *H04L 12/282* (2013.01); *H04L 12/2825* (2013.01); *H04L 12/2827* (2013.01); *D06F 2210/00* (2013.01); *H04L 2012/285* (2013.01)

(58) Field of Classification Search
CPC ........ G05B 15/02; G06Q 20/22; D06F 33/02; H04L 12/2827; H04L 12/2825; H04L 12/285
USPC .......................... 705/39; 700/83; 340/12.29
See application file for complete search history.

(56) References Cited

U.S. PATENT DOCUMENTS 5,799,281 A    8/1998   Login et al.
7,996,252 B2 *   8/2011   Shahrabi et al. ............. 705/7.32
(Continued)

FOREIGN PATENT DOCUMENTS

KR   10-2005-0025549    3/2005
KR   10-2005-0066451    6/2005
(Continued)

*Primary Examiner* — Jennifer Mehmood
*Assistant Examiner* — Omar Casillashernandez
(74) *Attorney, Agent, or Firm* — Dentons US LLP

(57) ABSTRACT

The present invention relates to a network system and a control method thereof. The network system includes: a commercial electric appliance comprising a cost system for an operation thereof; and a control device communicably connected to the commercial electric appliance, wherein the control device comprises a display unit configured to remotely monitor operation information of the commercial electric appliance.

30 Claims, 22 Drawing Sheets

(56) References Cited

U.S. PATENT DOCUMENTS

| | | |
|---|---|---|
| 2002/0010515 A1 | 1/2002 | Fukuoka et al. |
| 2002/0065770 A1* | 5/2002 | Ebata ............................ 705/39 |
| 2003/0058101 A1* | 3/2003 | Watanabe et al. ............ 340/540 |
| 2005/0222859 A1* | 10/2005 | Ha .................................. 705/1 |
| 2009/0112759 A1* | 4/2009 | Foster ........................... 705/40 |
| 2011/0088172 A1* | 4/2011 | Im et al. ......................... 8/137 |
| 2012/0110747 A1* | 5/2012 | Yum et al. ...................... 8/137 |
| 2012/0110749 A1* | 5/2012 | Park et al. ...................... 8/137 |
| 2012/0143708 A1* | 6/2012 | Viviano et al. ................ 705/24 |

FOREIGN PATENT DOCUMENTS

| | | |
|---|---|---|
| KR | 10-2005-0066455 | 6/2005 |
| KR | 10-2005-0066458 | 6/2005 |
| KR | 10-2005-0094246 | 9/2005 |
| KR | 10-2006-0016583 | 2/2006 |

* cited by examiner

NETWORK SYSTEM AND METHOD FOR CONTROLLING SAME

This application is a 35 USC §371 National Stage entry of International Application No. PCT/KR2012/002885 filed on Apr. 16, 2012, and claims priority of Korean Patent Application Nos. 10-2011-0035881 filed on Apr. 18, 2011; 10-2011-0037501 filed on Apr. 21, 2011; 10-2011-0037502 filed on Apr. 21, 2011 and 10-2011-0076388 filed on Aug. 1, 2011, which are hereby incorporated by reference in its entirety.

TECHNICAL FIELD

The present invention relates to a network system and a control method thereof.

BACKGROUND ART

In general, electric appliances used at homes include washing machines, refrigerators, cooker, and cleaners. Traditionally, to control operations of the electric appliances by a user, there is a disadvantageous that the user should approach the electric appliances to directly manipulate the electric appliances. However, with the development in communication technologies, there is a need for remotely control the electric appliances. Particularly, when the user uses a commercial electric appliance, there is a problem that the user stands by or monitors the electric appliance in the vicinity of the electric appliance until the commercial electric appliance is stopped in operation.

DISCLOSURE OF THE INVENTION

Technical Problem

The present invention provides a network system through which commercial electric appliances are communicably connected to a specific control device to remotely control the commercial electric appliances.

Technical Solution

In one embodiment, a network system includes: a commercial electric appliance comprising a cost system for an operation thereof; and a control device communicably connected to the commercial electric appliance, wherein the control device comprises a display unit configured to remotely monitor operation information of the commercial electric appliance.

In another embodiment, a method of controlling a network system includes: communicably connecting a commercial electric appliance to a control device; paying a cost required for using the commercial electric appliance; setting user identification information to the commercial electric appliance or the control device; and displaying information with respect to an operation of the commercial electric appliance on the control device.

Advantageous Effects

According to the present invention, since the commercial electric appliance is monitored or controlled by using the control device, the user's convenience may be improved.

Also, since the identification information of the user is required to connect the commercial electric appliance to the control device, accessibility of other users may be excluded. Thus, use stability (security) with respect to the commercial electric appliance may be maintained. Also, since the commercial electric appliance and the control device are communicably connected to each other, even though the user is disposed at a far distance from the electric appliance, the user may monitor or control the operation of the electric appliance.

Also, since the communication connection process or the user interface for controlling the electric appliance is simply realized, the use convenience of the user may be improved. Also, since the various cost payment methods are provided, the use convenience with respect to the commercial electric appliance may be improved.

Also, since the commercial electric appliance is easily reserved by using the specific connection device, even though the user does not directly visit the commercial store, the user may timely use the electric appliance. Also, since the electric appliance is reserved at the current time or in the specific time band, schedule of the user for using the electric appliance may be easily adjusted.

Also, when the specific user completely uses the electric appliance, since the server or the other user informs the collection of the consumable to the specific user, the posterior user may quickly use the electric appliance. Also, since the use conversion of the electric appliance is quickly performed according to an order of the users, profit due to the use of the electric appliance may be improved in aspect of the commercial store.

Also, since the device information of the electric appliance and the information of the remote device are matched in the server, and the operation information of the electric appliance is transmitted into the remote device on the basis of the matched information, even though the communication between the electric appliance and the remote device is impossible, the operation state of the electric appliance may be remotely monitored.

Also, when the electric appliance is the commercial electric appliance, since the matching of the electric appliance and the remote device is maintained or released (release alarm) according to whether the cost required for using the electric appliance is paid, the system may be stably realized, and the feedback to the user may be efficiency realized.

MODE FOR CARRYING OUT THE INVENTION

Reference will now be made in detail to the embodiments of the present invention, examples of which are illustrated in the accompanying drawings. The invention may, however, be embodied in many different forms and should not be construed as being limited to the embodiments set forth herein; rather, that alternate embodiments included in other retrogressive inventions or falling within the spirit and scope of the present invention will fully convey the concept of the invention to those skilled in the art.

Figure 1:
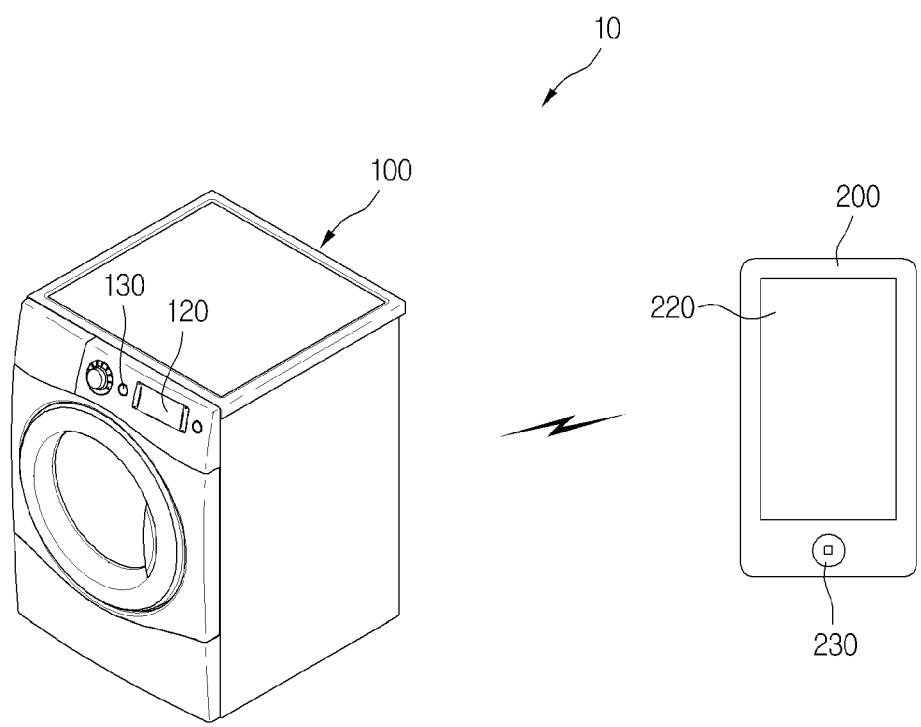
FIG. 1 is a schematic view of a network system according to a first embodiment of the present invention.
Figure 2:
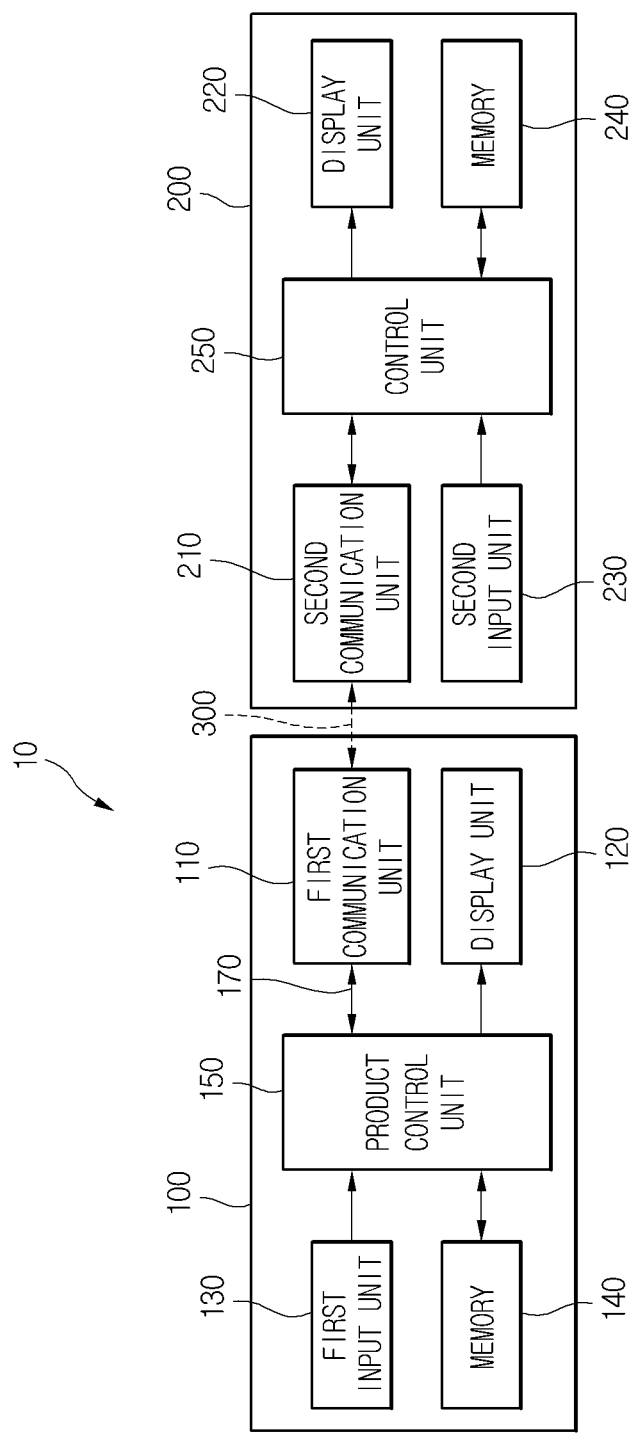
FIG. 2 is a schematic block diagram of the network system according to the first embodiment of the present invention.

FIG. 1 is a schematic view of a network system according to a first embodiment of the present invention, and FIG. 2 is a schematic block diagram of the network system according to the first embodiment of the present invention.

Referring to FIGS. 1 and 2, a network system 10 according to a first embodiment of the present invention includes an electric appliance 100 for performing a preset function as one component constituting the network system 10 and a control device 200 for controlling the electric appliance 100 as the other component constituting the network system 10. The control device 200 may be called a "connection device" in that the control device 200 is communicably connected to the electric appliance 100.

The electric appliance 100 includes a commercial electric appliance. In the current embodiment, a commercial washing machine of the commercial electric appliance will be described as an example. The commercial washing machine may be a washing machine used in a laundry. Many and unspecified persons may use the commercial washing machine by paying the price. After one user uses completely the washing machine, a posterior user may use the washing machine. However, the current embodiment is not limited to the commercial washing machine. For example, the current embodiment may be applied to a refrigerator, a cooker, a dryer, an air conditioner, a cleaner, a purifier, and the like in addition to the washing machine within the spirit and scope of the present invention.

The control device 200 may include a remote controller for controlling the electric appliance 100 at a position spaced apart from the electric appliance 100. The control device 200 may be a device provided in the laundry, i.e., an exclusive device for product. Alternatively, the control device 200 may be a portable terminal (mobile phone) that is portable by a user. The control device 200 may wirelessly communicate with the electric appliance 100 and be portable by the user.

The electric appliance 100 includes a first communication unit 110 communicably connected to the control device 200, a display unit 120 for displaying an operation state of the electric appliance 100, a first input unit 130 for inputting a predetermined command to operate the electric appliance 100, a memory 140 for storing operation information of the electric appliance 100, and a product control unit 150 for controlling the above-described units.

The first communication unit 110 may be understood as a gateway connected to the control device 200. Also, the first communication unit 110 receives external information according to a control command of the product control unit 150 to transmit the received information into the product control unit 150 or transmits internal information of the electric appliance 100 to the outside (for example, to the control device 200). An internal interface 170 for transmitting/receiving information (data) may be provided between the first communication unit 110 and the product control unit 150.

The control device 200 includes a second communication unit 210 communicably connected to the first communication unit 110, a display unit 220 for displaying a user interface of the control device 200, a second input unit 230 for inputting a predetermined command into the control device 200, a memory 240 for storing operation information of the control device 200 or the electric appliance 100, and a control unit 100 for remotely controlling the above-described units.

The second communication unit 210 receives the operation information of the electric appliance 100 from the first communication unit 110. Also, the second communication unit 410 may transmit information related to a control command of the control device 200 into the first communication unit 110. A first interface 300 for communicating may be defined between the first communication unit 110 and the second communication unit 210.

The display unit 220 may display information related to an operation of the control device 200 or the electric appliance 100. A predetermined command may be inputted into the second input unit 230 to control the operation of the electric appliance 100. A plurality of information for performing a function of the control device 200 may be stored in the memory 240. The plurality of information may include first information related to the performance of a proper function of the control device 200 itself or second information related to the performance of a function or an operation of the electric appliance 100.

Figure 3:
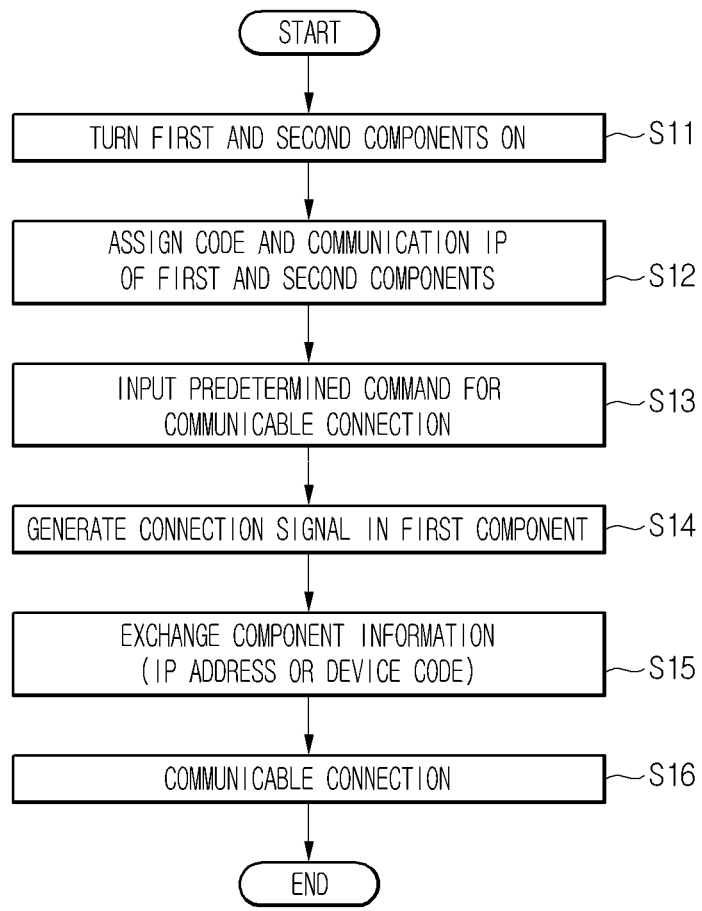
FIG. 3 is a flowchart illustrating a process of communicably connecting a plurality of components to each other according to the first embodiment of the present invention.

FIG. 3 is a flowchart illustrating a process of communicably connecting a plurality of components to each other according to the first embodiment of the present invention.

Referring to FIG. 3, communication for transmitting/receiving information between a first component and a second component may start. Here, the first component may be a control device 200. The second component may be an object to be controlled by the control device, for example, the commercial electric appliance 100.

When the first component is turned on, a device code (a first device code) of the first component is recognized in the first component. Then, an IP (communication address) of the second communication unit 210 may be assigned. The device code may be a proper identification number (character) given when the first component is manufactured, installed, or sold. When the first component is turned on, information related to the device code may be transmitted into the second communication unit 210.

The IP may be set to a fixed IP or a variable (changeable) IP to communicate with the second component. Also, the IP may be assigned through a separate access point (AP) according to a communication method or may be assigned by self set of the first component. For example, the communication method may include Wifi, Bluetooth, or Zigbee. Similarly, when the second component is turned on, a device code (a second device code) of the second component is recognized in the second component. Then, an IP (communication address) of the first communication unit 110 may be assigned (S11 and S12).

For communication between the first component and the second component, a predetermined command may be inputted into the first component or the second component. For example, a predetermined command may be inputted into the first component defined as the control device. The predetermined command may be understood as executed predetermined information for controlling an operation of the second component. The predetermined information may be a specific program (e.g., an application). Also, the specific program may be previously stored in the first component, i.e., the memory 240 of the control device 200 (S13). When the predetermined command is inputted, a connection sequence for connecting the second component may occur in the first component. The connection sequence of the first component may be transmitted into the second component (S14).

Also, information of the first component and information of the second component may be exchanged with each other. The information exchanged between the first component and the second component may include an IP address and a device code of each of the components. The first and second components may recognize or search an opponent component (device) to directly exchange the information therebetween. Also, the information may be exchanged via a specific server for storing information of the first or second component (S15).

As the information of the first component and the second component are exchanged with each other, the first and second components may be communicably connected to each other. When the first and second components are communicably connected to each other, the information (data) may be transmitted/received therebetween. As described above, as the first and second components share respective information, the first or second component may be easily controlled (S16).

Figure 4:
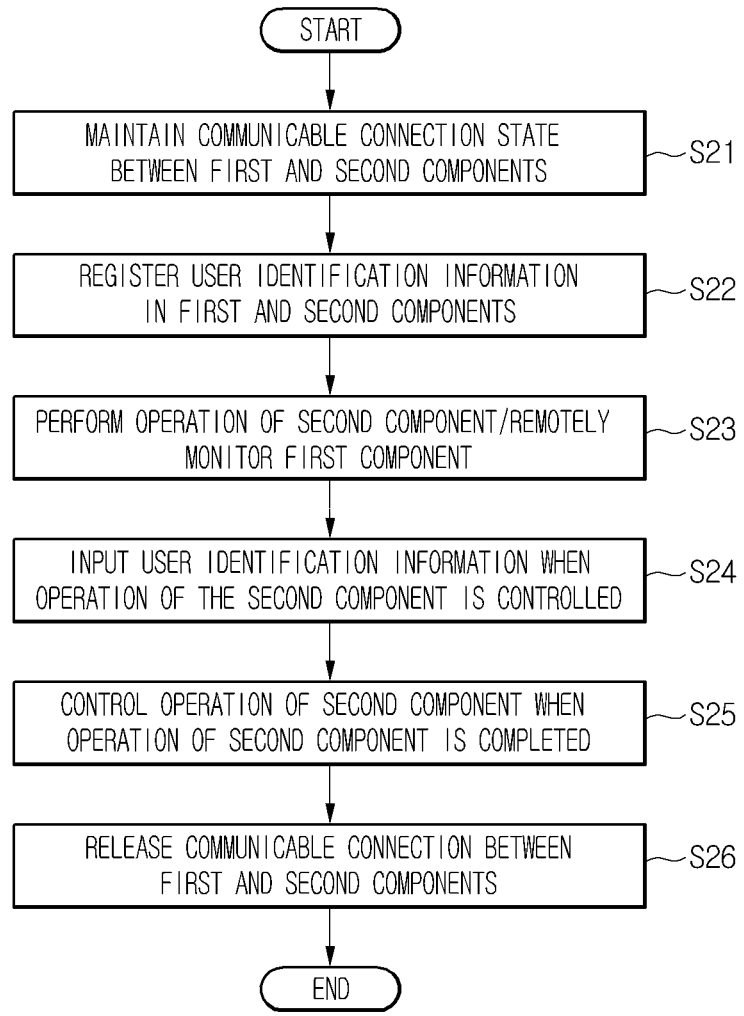
FIG. 4 is a flowchart illustrating a process of remotely monitoring the plurality of components and controlling operations of the plurality of components according to the first embodiment of the present invention.

FIG. 4 is a flowchart illustrating a process of remotely monitoring the plurality of components and controlling operations of the plurality of components according to the first embodiment of the present invention.

Referring to FIG. 4, in the state where the first and second components are communicably connected to each other, user identification information may be registered in the first and second components. Although not shown, a process of paying a predetermined cost may be performed before the user identification information is registered. Description related to the above-described process will be described later.

Since the second component operates in a state of being exposed to many and unspecified persons, it may be necessary to control an operation of the second component by only a specified user. Thus, the user identification information may be registered in the first or second component so that only the specified user is accessible. The user identification information may include an ID or password defined by the user. For example, when the user sets an ID or password in the second component, information related to the set ID or password may be transmitted (synchronized) into the first component. On the other hand, when the user sets the ID or password in the first component, the information related to the set ID or password may be transmitted into the second component.

When the ID or password is completely set, to control an operation of the second component, it is necessary to input the ID or password into the first or second component. When the ID or password is set once, the user may also use other commercial washing machines in the corresponding laundry. Also, the ID or password may be changed later. When the user identification information is inputted, information related to the plurality of electric appliances may be confirmed by using the first component. Also, predetermined action for using a specified electric appliance may be performed.

Although the user identification information is registered in the state where the communication between the first and second components is maintained in the drawings, the first and second components are communicably connected to each other to synchronize the user identification information after the user identification information is registered (S21 and S22).

After the user identification information is set or inputted, the operation of the second component may be performed. The operation state of the second component may be confirmed through the display unit 120. Alternatively, the operation state of the second component may also be confirmed through the display unit 220 of the first component. That is, the operation state of the second component may be remotely monitored through the first component. The monitoring information may include operating state information of the second component, e.g., operating information or completed information. When an operation error of the second component occurs, the monitoring information may include the corresponding error information. Due to the remote monitoring, it may be unnecessary to approach the second component so as to confirm the operation state of the second component one by one (S23).

When the operation of the second component is controlled, the input of the user identification information may be required. The input of the user identification information may be performed by the first or second component. Through the input of the user identification information, the first or second component may be remotely monitored or controlled. In detail, when the operation of the second component starts, the input of the ID or password through the first or second component is required. That is, if the ID or password is not inputted, the operation of the second component may be limited.

Also, the input of the ID or password may be required in a process in which the second component is operating, door locking (preventing a door from being opened during the operation of the washing machine) of the washing machine is released after the operation of the washing machine is completed, or the door of the washing machine is opened. The door may be a door which is provided in the washing machine, the dryer, the refrigerator, or the cooker. That is, the door may be understood as a unit for opening or closing an accommodation space of the electric appliance so that a specific object is taken in or out therethrough. When the door is opened, laundry or foods may be taken in or out.

As described above, since the input of the ID or password is required to control (manipulate) the operation of the second component from an operation starting time point to an operation ending time point of the second component, manipulation of a third person except for the corresponding user may be limited. As a result, the second component (the commercial washing machine) may be stably controlled (S24).

When the operation of the second component is completed, for example, when a washing or dehydrating process of the commercial washing machine is completed, the second component may be controlled according to an ending mode. After a specific user uses completely the washing machine, a posterior user may use the washing machine. However, if the posterior user randomly opens the door of the washing machine, the laundry may be lost. The ending mode may include an option with respect to whether the door is openable after the use of the washing machine is completed. A first mode in which the door locking is released so that the door is openable by any person after the use of the washing machine is completed and a second mode in which the door locking is released only when the user identification information is inputted.

Whether the first or second mode is selected may be set at the operation starting time point of the washing machine. For example, if the first mode is set, the posterior user may take the laundry of the former user out of the washing machine, and then take own laundry in the washing machine to operate the washing machine. On the other hand, if the second mode is set, since the washing machine door is opened only when the corresponding user inputs the user identification information, the posterior user should wait until the former user takes the laundry out of the washing machine. However, when it takes a long time to take the laundry out of the washing machine by the former user, the use of the washing machine for the posterior user may be limited. Thus, the washing machine may be controlled so that the former user should pay an additional cost to open the door when a preset time elapses after the operation of the washing machine is completed (S25).

When all processes with respect to the use of the washing machine for the former is completed, the communication between the first and second components may be released. Then, the posterior user may use the corresponding washing machine. If the first component is an exclusive control device for the commercial washing machine, the posterior user may take the control device from the former user to control the washing machine (S26).

Figure 5:
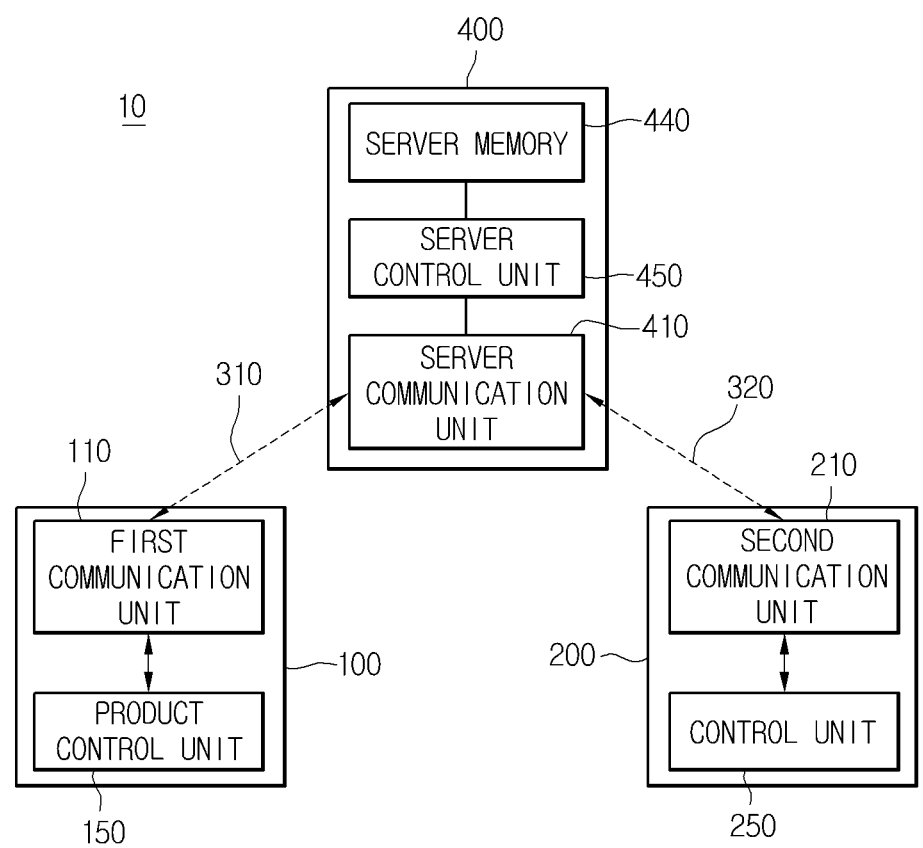
FIG. 5 is a schematic block diagram of a network system according to a second embodiment of the present invention.

FIG. 5 is a schematic block diagram of a network system according to a second embodiment of the present invention.

Referring to FIG. 5, a network system 10 according to a second embodiment of the present invention includes a server 400 communicably connected to an electric appliance 100 and a control device 200. The server 400 includes a server communication unit 410 communicably connected to first and second communication units 110 and 210, a server memory 440 storing operation information of the electric appliance 100 or the control device 200, and a server control unit 450 controlling operations of the server communication unit 410 and the server memory 440. A second interface 310 is defined between the server communication unit 410 and the first communication unit 110, and a third interface 320 is defined between the server communication unit 410 and the second communication unit 210.

The electric appliance 100 and the control device 200 may transmit or receive predetermined information through the server 400. For example, operation information of the electric appliance 100 may be transmitted into the server 400 through the second interface 310 and transmitted into the control device 200 through the third interface 320. Through the above-described process, the operation state of the electric appliance 100 may be monitored by the control device 200. Control information of the control device 200 may be transmitted into the server 400 through the third interface 320 and transmitted into the electric appliance 100 through the second interface 310. Through the above-described process, the operation of the electric appliance 100 may be controlled by the control device 200.

When user identification information is registered, the server 400 may transmit predetermined identification information into the electric appliance 100 or the control device 200. When a user inputs the transmitted identification information into the electric appliance 100 or the control device 200, the operation control of the electric appliance 100 may be performed. The predetermined identification information may be dissipated by being used only once or be continuously used when the user uses the washing machine later.

Figure 6:
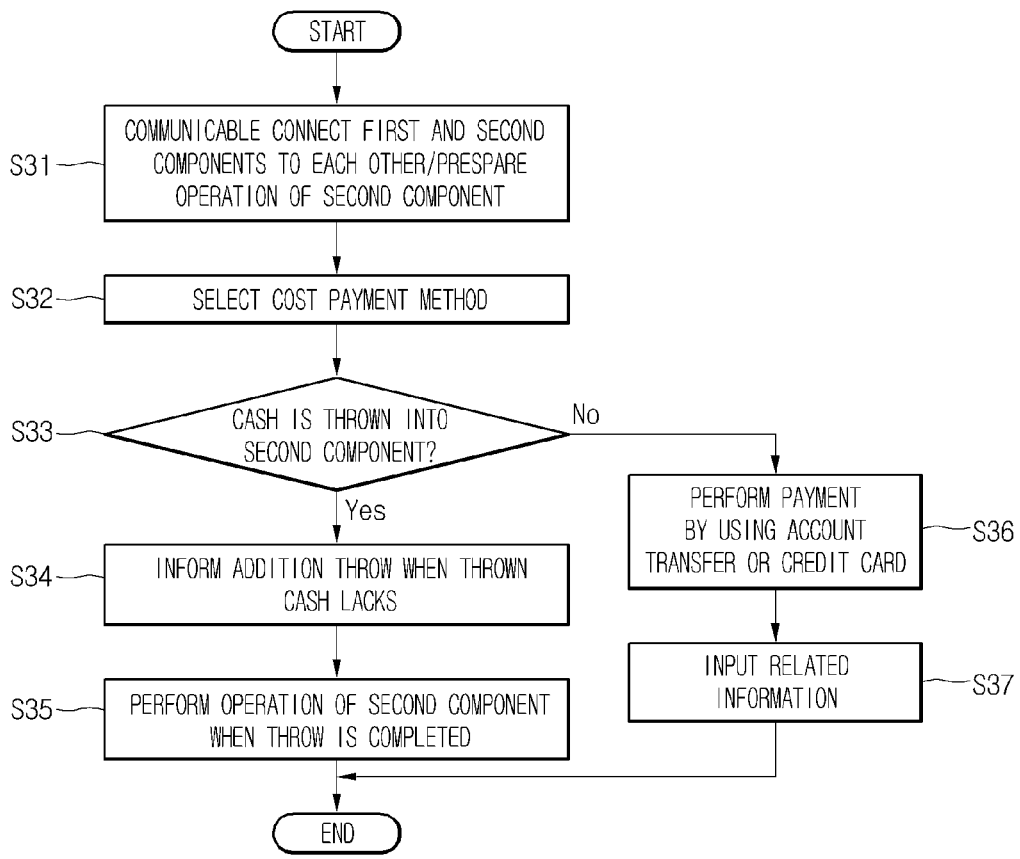
FIG. 6 is a flowchart illustrating a payment method of a cost system according to an embodiment of the present invention.

FIG. 6 is a flowchart illustrating a payment method of a cost system according to an embodiment of the present invention. A payment method of a system related to a cost to be paid to use the commercial washing machine will be described with reference to FIG. 6.

When first and second components communicate with each other, and an operation of the second component is prepared, a cost payment method is selected (S31 and S32). If cash is selected as the cost payment method, the user may throw predetermined cash into the second component (the commercial washing machine). If the thrown cash lacks, a message for requesting an additional throw of cash may be displayed (S33 and S34). When the additional throw of the cash is completed, an operation of the second component may be performed (S35). On the other hand, when account transfer or a credit card is selected as the cost payment method, related information (account number or credit card number) may be inputted into the first or second component. When it is recognized that the related information is accurate information, the operation of the second component may be performed (S36 and S37).

When the when account transfer or credit card is selected as the cost payment method, the use cost for the washing machine may be paid at a predetermined period. For example, the use cost may be paid at a specific data in every method. Also, information with respect to the paid use cost may be informed into the first component (alarm message). As described above, since various payment methods are used in use of the commercial electric appliance, use convenience of the user may be improved.

Figure 7:
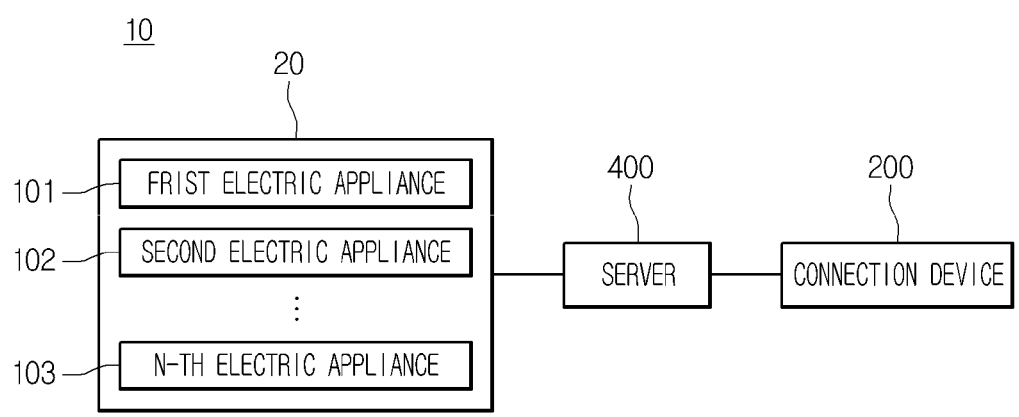
FIG. 7 is a schematic block diagram of a network system according to a third embodiment of the present invention.

FIG. 7 is a schematic block diagram of a network system according to a third embodiment of the present invention.

Figure 8:
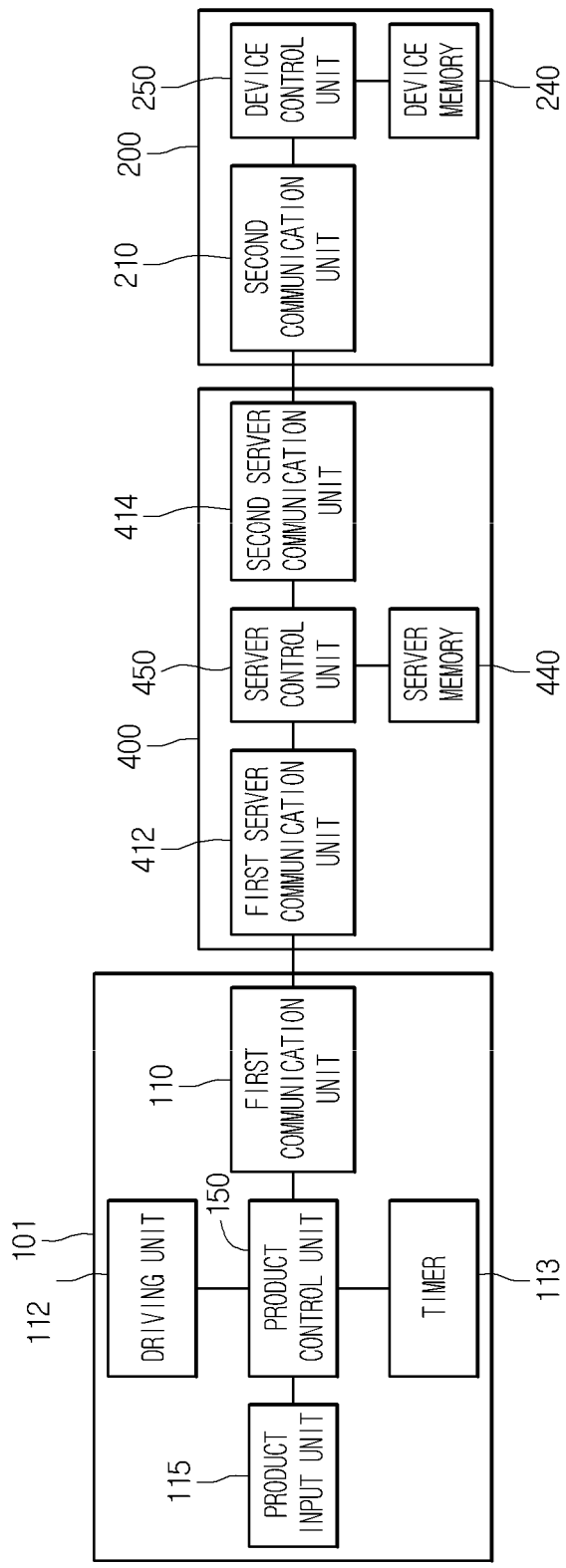
FIG. 8 is a detailed schematic block diagram of the network system shown in FIG. 7.

Referring to FIGS. 7 and 8, a network system 10 according to a third embodiment of the present invention includes a used place 20 in which a plurality of electric appliances are disposed, a server 400 communicably connected to the plurality of electric appliances disposed in the used place 20, and a connection device connected to the server 400 to confirm information with respect to the plurality of electric appliances. The connection device may correspond to the "control device" described above.

First, second, . . . , n-th electric appliances 101, 102, . . . , 103 are disposed in the used place 100. The first, second, . . . , n-th electric appliances 101, 102, . . . , 103 may be understood as components constituting the network system 10, e.g., devices for performing a preset function thereof. Also, each of the electric appliances may be used as a device for managing or processing predetermined consumables. For example, when the electric appliance is provided as the washing machine or dryer, the consumables may be laundry. Also, when the electric appliance is provided as the refrigerator, cooker, or purifier, the consumables may be foods.

The connection device 200 may be understood as the other component constituting the network system 10, e.g., a device for monitoring information with respect to the electric appliances 101, 102, and 103 or controlling operations of the electric appliances 101, 102, and 103. The connection device 200 may receive the information with respect to the electric appliances 101, 102, and 103 through the server 400. The connection device 200 may include a personal computer (PC) or a mobile phone (Smart phone) which is communicably connectable to the server 400. Also, the connection device 200 may be connected to the server 400 by a predetermined communication method. The communication method may include at least one of Internet, Wifi, Bluetooth, 3G/4G network. When the Internet is applied as the communication method, the server 400 may be a web server.

The information with respect to the plurality of electric appliances 101, 102, and 103 disposed in the used place 20 (hereinafter, referred to as electric appliance information) is stored in the server 400. The electric appliance information includes information with respect to the electric appliance itself, for example, information with respect to a kind of electric appliance, a manufacturer, a model name, capacity, or power consumption level and information with respect to an operation of the electric appliance, i.e., information with respect to kinds/number of usable electric appliances, an operation time (remaining time) of the electric appliance, power costs, or use costs.

A specific program (application) easily connected to the server 40 to confirm the electric appliance information or for performing the setting (manipulating) of use of the electric appliance may be stored in the connection device 200. In the setting of use of the electric appliance may include use reservation of a specific electric appliance. The specific program may be downloaded from the outside to the connection device 200.

The first, second, . . . , n-th electric appliances 101, 102, . . . , 103 may be a "commercial electric appliance" that is operable only when the cost system is provided to pay the predetermined cost. In this case, the used place 20 may be a "commercial store" in which at least one commercial electric appliance is provided. A first electric appliance 101 of the plurality of electric appliances 101, 102, and 103 will be described as an example. The same idea of the present invention may also be applied to the second and third electric appliances.

In detail, the first electric appliance 101 includes a driving unit 112 for performing the function of the electric appliance. The driving part 112 may include a motor, a compressor, or a heater. Also, the first electric appliance 101 may include a timer 113 integrating a time related to the operation of the electric appliance 101. When the first electric appliance 101 operates for a predetermined time according to a preset course, the timer 113 may integrate an operation elapsed time or a remaining time.

The first electric appliance 101 includes a first communication unit 110 for transmitting the information with respect to the operation of the first electric appliance 101 to the outside. The first communication unit 110 may transmit driving information of the driving unit 112 or integrated information of the timer 113 to the server 400. Also, the first electric appliance 101 includes a product input unit 115 for inputting a predetermined command to operate the first electric appliance 101.

The server 400 includes a first server communication unit 412 communicably connected to the first communication unit 110, a server memory 440 for storing the information with respect to the first electric appliance 101, and a second server communication unit 414 communicably connected to the connection device 200.

The connection device 200 includes a second communication unit 210 communicably connected to the second server communication unit 414, a device memory 240 storing information with respect to the first electric appliance 101 or specific information (e.g., application) for connecting the server 400, and a device control unit 250 controlling an operation of the connection device 200. A communication method defined between the first communication unit 110 and the first server communication unit 412 is called a first interface, and a communication method defined between the second server communication unit 414 and the second communication unit 210 is called a "second interface".

The first interface or the second interface may be set through generation/exchange of information between the plurality of components. The components may include the electric appliance, the server, or the connection device. The first component may be one component of the plurality of components, and the second component may be the other component communicating with the one component. When the first component of the components is turned on, a device code of the first component is recognized in the first component. Then, an IP (communication address) of the first communication unit may be assigned.

When the first component is turned on, information related to the device code may be transmitted into the communication unit. When the first component is the connection device (mobile phone), the device code may include a telephone number. The IP may be set to a fixed IP or a variable (changeable) IP to communicate with the second component.

Similarly, when the second component is turned on, a device code of the second component is recognized in the second component. Then, an IP of the second communication unit provided in the second component may be assigned. For communication between the first component and the second component, a predetermined command may be inputted into the first component or the second component.

For example, the predetermined command may be recognized from the first component defined as the connection device. The predetermined command may be one information for connecting the second component (e.g., the server). The predetermined information may be a specific program (e.g., an application). Also, the specific program may be previously stored in the device memory 240 of the connection device 200. When the predetermined command is inputted, a connection sequence for connecting the second component may occur in the first component. The connection sequence of the first component may be transmitted into the second component. Also, information of the first component and information of the second component, i.e., the IP or device code information may be exchanged with each other.

As the information of the first component and the second component are exchanged with each other, the first and second components may be communicably connected to each other. When the first and second components are communicably connected to each other, the information (data) may be transmitted/received therebetween. Also, user identification information may be inputted into the first component or the second component. The user identification information may include a user ID or password.

For example, when the server 400 is a web server, the application may be executed to communicably connect the connection device 200 to the server 400, thereby displaying a web page for inputting the user identification information. When the user identification information is inputted, information related to the plurality of electrical appliances may be confirmed by using the first component. Also, predetermined action for using a specified electrical appliance may be performed.

Figure 9:
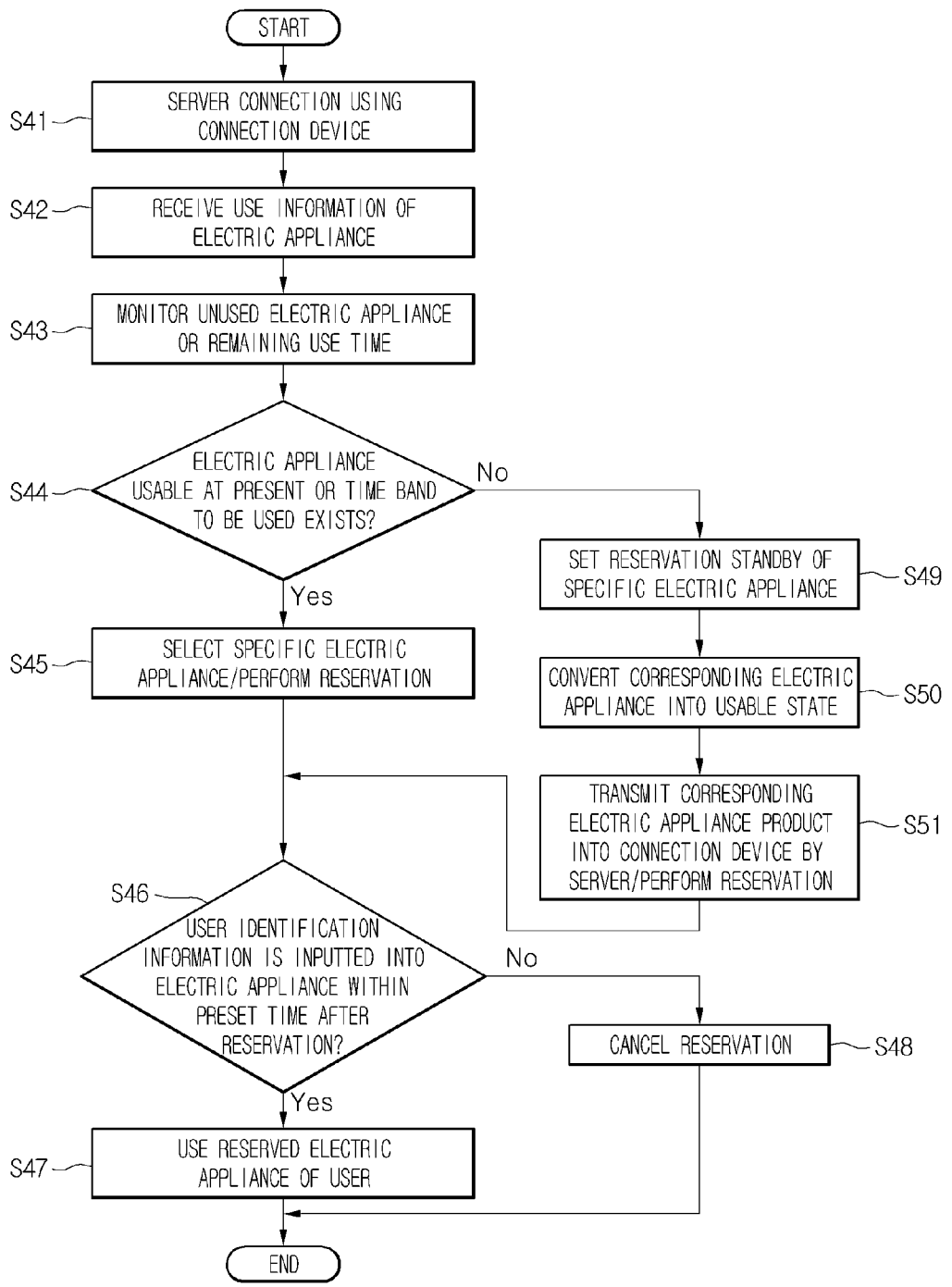
FIG. 9 is a flowchart illustrating a reservation process of an electric appliance according to the third embodiment of the present invention.

FIG. 9 is a flowchart illustrating a reservation process of an electric appliance according to the third embodiment of the present invention. A reservation method of a commercial electric appliance according to a third embodiment of the present invention will be described with reference to FIG. 9.

The commercial electric appliance is connected to a server by using a connection device 200 (S41). Then, when user identification information is inputted, information with respect to a plurality of electric appliances 101, 102, and 103 to be used by a user are received. The information with respect to the plurality of electric appliances 101, 102, and 103 includes information with respect to a currently usable electric appliance as an electric appliance that does not operate yet and information with respect to a currently unusable electric appliance.

For example, information with respect to the number of usable electric appliances of the total electric appliances and a kind of usable electric appliance may be confirmed. If the electric appliance is operating, a remaining time until use of the electric appliance is completed may be confirmed. If a plurality of electric appliances are provided, a remaining time for each electric appliance may be confirmed. Thus, the user may confirm whether the electric appliance is usable with a time band desired by the user.

The user may previously input information (condition) with respect to the use time band of the electric appliance desired by the user. For example, if the user intends to confirm an electric appliance that is usable after one hour from the present, time information with respect to this may be inputted. Thus, the server 400 may display a list of the electric appliances that are not used in the corresponding time band on the basis of the inputted time information (S42 and S43).

The user may recognize whether an electric appliance usable at the present or in the time band desired by the user exists (S44). If it is recognized that the usable electric appliance exists, the user may select a specific electric appliance to reserve the selected electric appliance. While the reservation of the selected electric appliance is performed, it may be required to input the user identification information again. When the reservation is completed, locking of the reserved electric appliance may be set to present other persons from being accessed in the corresponding time band. For example, a door of the commercial washing machine may be locked. The locking may be performed by a command transmitted from the server 400 to the control unit 150 of the electric appliance.

After the reservation of the specific electric appliance is completed, it is recognized whether predetermined information is inputted into the electric appliance within the set time. The predetermined information may be information for informing whether a person intending to use the electric appliance is a subscriber, e.g., the user identification information. Also, the user identification information may be inputted through the product input unit 115 (S46).

When the user identification information is inputted within a preset time, the electric appliance 101 may operation in a usable state. For example, the locking of the commercial wishing machine may be released to open the door. Also, the reserved user may use the electric appliance 101. While the electric appliance 101 is used, the user may monitor the information with respect to the electric appliance 101 by using the connection device 200 and control (stop, course change, stop command, etc.) the operation of the electric appliance 101.

On the other hand, if the user identification information is not inputted into the electric appliance 101 within the preset time after the reservation, the reservation of the user may be cancelled. This is done for prevent the user from cancelling the reservation without using the electric appliance. If the reservation is cancelled, the locking of the corresponding electric appliance may be released. Thus, the right of using may be converted into other users (S48). If the electric appliance usable at the present or in the time band to be used by the user does not exist in the operation S44, standby reservation of the specific electric appliance may be set. That is, the specific electric appliance to be used in the plurality of electric appliances may be selected to reserve the selected specific electric appliance for a posterior user (S49).

When the electric appliance is converted into a usable state after a time elapses, state information of the corresponding electric appliance may be transmitted from the server 400 into the connection device 200. The state information may be displayed on the connection device 200. The state information may be displayed in a screen or sound output method. Also, the use reservation with respect to the corresponding electric appliance may be automatically set or be manually set by the user. In the next process, the reservation may be cancelled. When the reservation of the corresponding electric appliance is completed, processes following the operation S45 are performed (S50 and S51).

Figure 10:
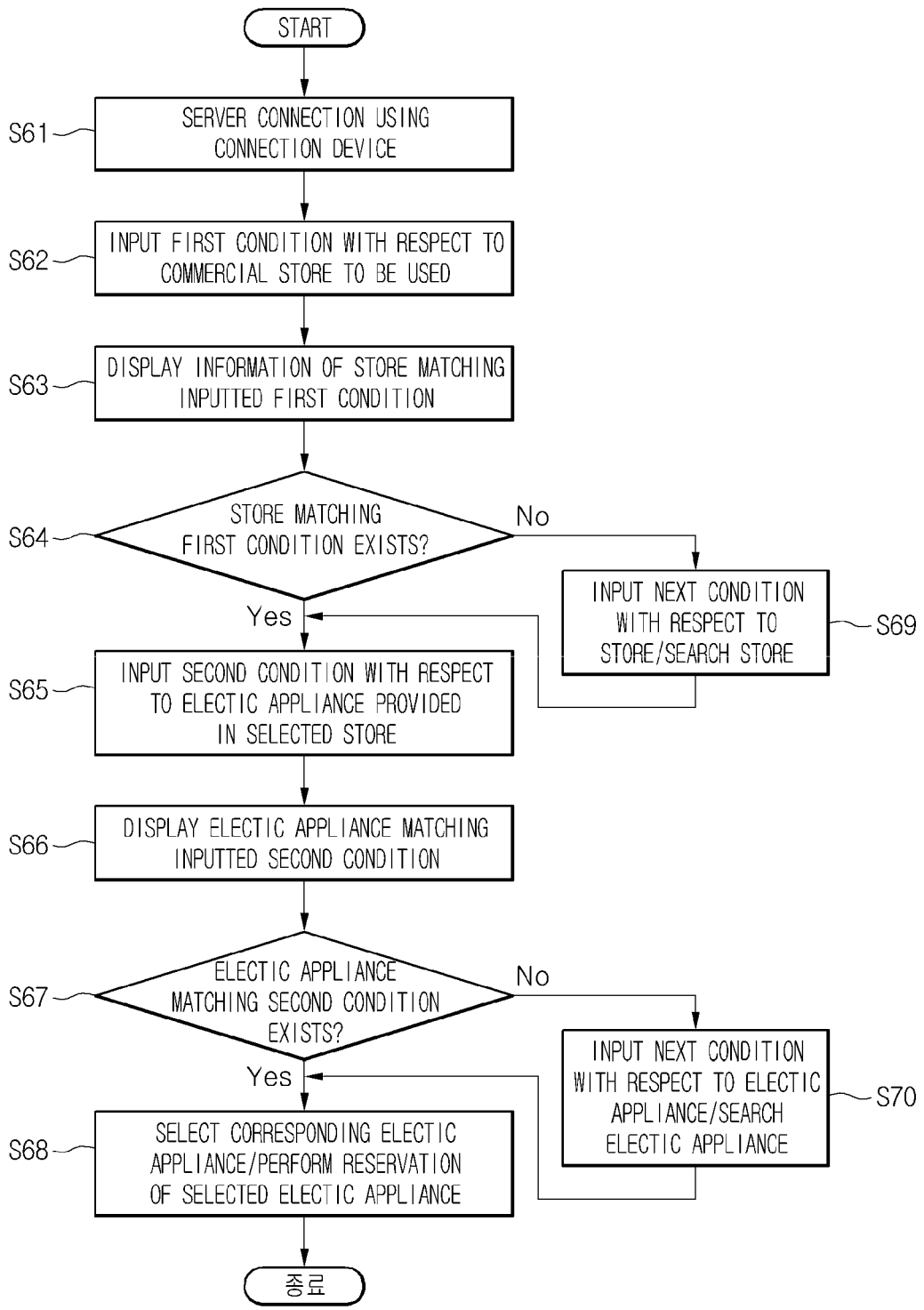
FIG. 10 is a flowchart illustrating a reservation process of an electric appliance according to a fourth embodiment of the present invention.

FIG. 10 is a flowchart illustrating a reservation process of an electric appliance according to a fourth embodiment of the present invention. A reservation process of an electric appliance according to a fourth embodiment will be described with reference to FIG. 10.

The electric appliance is connected to a server 400 by using a connection device 200 (S61). Then, a first condition with respect to a used place 20 to be used, i.e., a commercial store may be inputted. The first condition may include a condition for selecting a specific store such as a commercial store disposed within a predetermined range from a specific area or a commercial store including a specific electric appliance (S62).

When the first condition is inputted, information with respect to a commercial store matching the inputted first condition may be displayed. If a store matching the first condition exists, a second condition with respect to electric appliances provided in the selected store may be inputted. The second condition may include conditions respect to a kind, a size (capacity), or use cost of the electric appliance (S63, S64, and S65).

When the second condition is inputted, information with respect to a commercial store matching the inputted second condition may be displayed. If a store matching the second condition exists, the corresponding electric appliance may be selected to reserve the selected electric appliance (S66, S67, and S68). Also, an idea for determining whether the reservation is maintained according to whether the corresponding electric appliance is used within a preset time after the reservation is completed is the same as that described in the third embodiment.

If a commercial store matching the first condition does not exist in the operation S64, a next condition with respect to the store may be inputted, and then electric appliances matching the inputted condition may be searched. If a store matching the inputted condition is not searched even though the next condition is inputted, a condition after the next may be repeatedly inputted. That is, the condition input may be performed until a store matching the condition exists (S39). The user may select one store of the searched stores, and then the second condition with respect to electric appliance provided in the selected store may be inputted (S65).

In operation S37, if an electric appliance matching the inputted second condition does not exist, a next condition may be inputted to search an electric appliance matching the inputted condition may be searched. If an electric appliance matching the inputted condition is not searched even though the next condition is inputted, a condition after the next condition may be repeatedly inputted. That is, the condition input may be performed until an electric appliance matching the condition is searched (S39). The user may select one electric appliance of the searched electric appliances, and then reservation with respect to the selected electric appliance is performed (S65).

Figure 11:
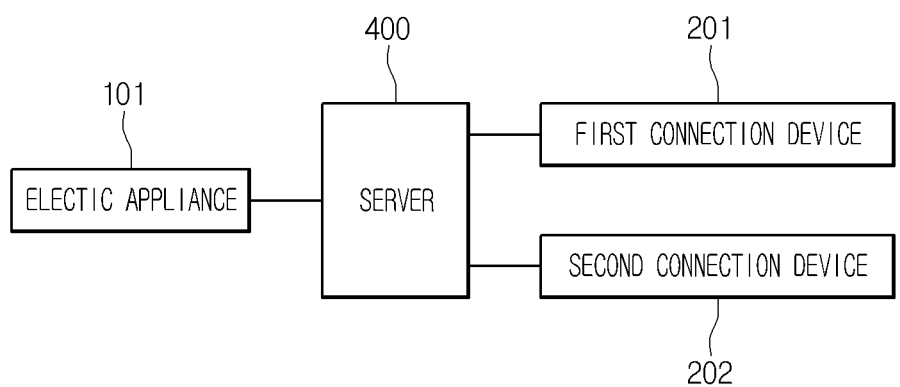
FIG. 11 is a schematic block diagram of a network system according to a fifth embodiment of the present invention.

FIG. 11 is a schematic block diagram of a network system according to a fifth embodiment of the present invention.

Figure 12:
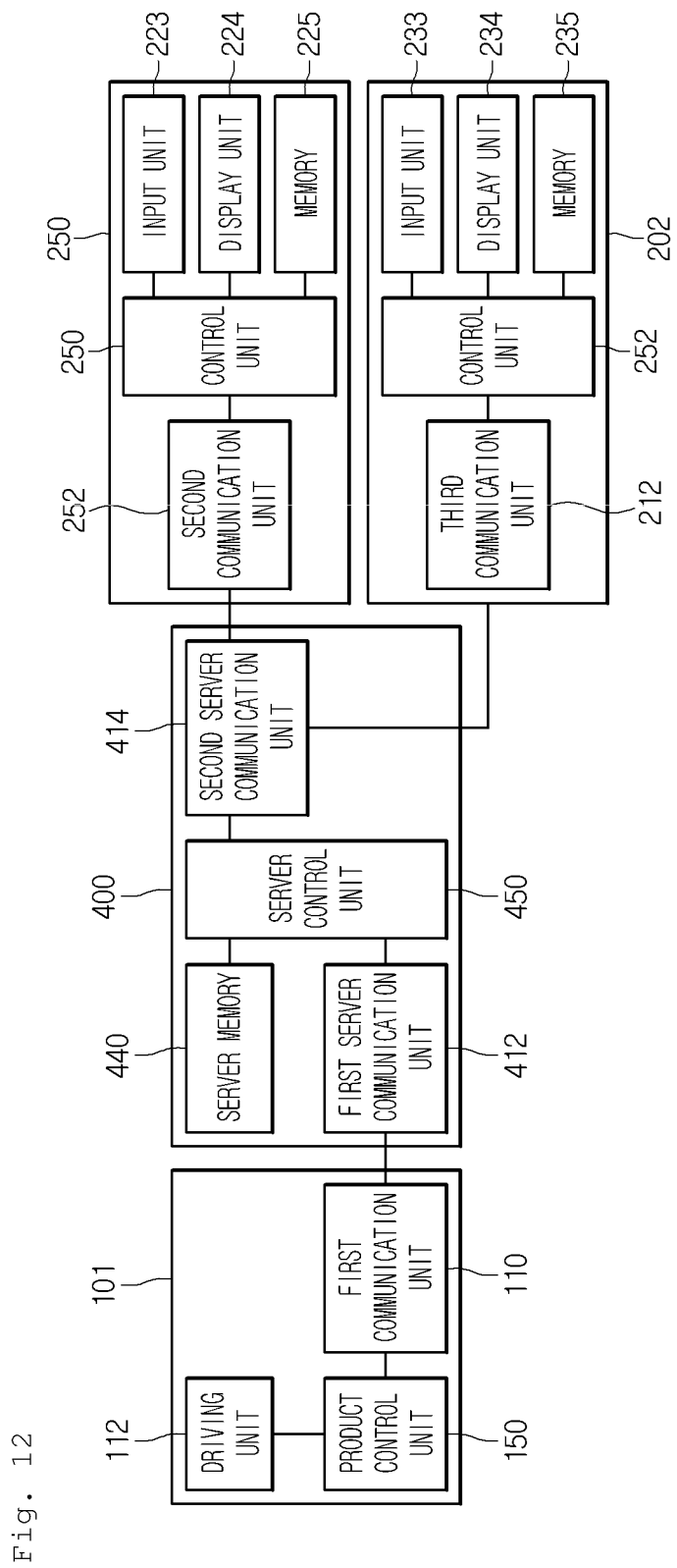
FIG. 12 is a detailed schematic block diagram of the network system shown in FIG. 11.

Referring to FIGS. 11 and 12, a network system 101 according to a fifth embodiment of the present invention includes an electric appliance 101 for managing or processing a predetermined consumable, a sever 400 communicably connected to the electric appliance 101 to store information with respect to an operation of the electric appliance 101, and a plurality of connection devices 201 and 202 communicably connected to the server 400.

The plurality of connection devices 201 and 202 include a first connection device 201 manipulated by one user to connect the first connection device 201 to the server 400 and a second connection device 202 manipulated by the other user to connect the second connection device 202 to the server 300. The first and second connection devices 201 and 202 may perform reservation of an electric appliance through the server 400. Also, first and second connection devices 201 and 202 may monitor an operation state of the corresponding electric appliance and controls an operation of the corresponding electric appliance. The one user and the other user may be different from each other. For example, the other user may be a posterior user of the one user.

In detail, the electric appliance 101 includes a driving unit 112 driven to perform a function of the electric appliance, a first communication unit 110 transmitting information with respect to an operation of the electric appliance 101 to the outside, and a product control unit 150 controlling an operation of the electric appliance 101. The first communication unit 110 may transmit driving information of the driving unit 112 to the server 400.

The server 400 includes a first server communication unit 412 communicably connected to the first communication unit 110, a server memory 440 for storing the information with respect to the first electric appliance 101, and a second server communication unit 414 communicably connected to the connection devices 201 and 202.

The first connection device 201 includes a second communication unit 211 communicably connected to the second server communication unit 414, an input unit 223 for inputting a predetermined command, a display unit 224 for displaying information with respect to an operation of the electric appliance 101 or predetermined information transmitted from the server 400, a memory 225 for storing information with respect to the electric appliance 101 or specific information (e.g., application) for connecting the first connection device 201 to the server 400, and a control unit 251 for controlling an operation of the first connection device 201. The second connection device 202 includes a third communication unit 212, an input unit 233, a display unit 234, a memory 235, and a control unit 252 which correspond to the constitutions of the first connection device 201.

A communication method defined between the first communication unit 110 and the first server communication unit 412 and a communication method defined between the second server communication unit 414 and the second communication units 211 and 212 are derived from the descriptions with respect to the first and second interfaces according to the first embodiment. Hereinafter, a control method of a network system in which, when an operation of a specific electric appliance is completed, the completion of the operation of the specific electric appliance is notified to the user so that a posterior user uses the electric appliance will be described with reference to the accompanying drawings.

Figure 13:
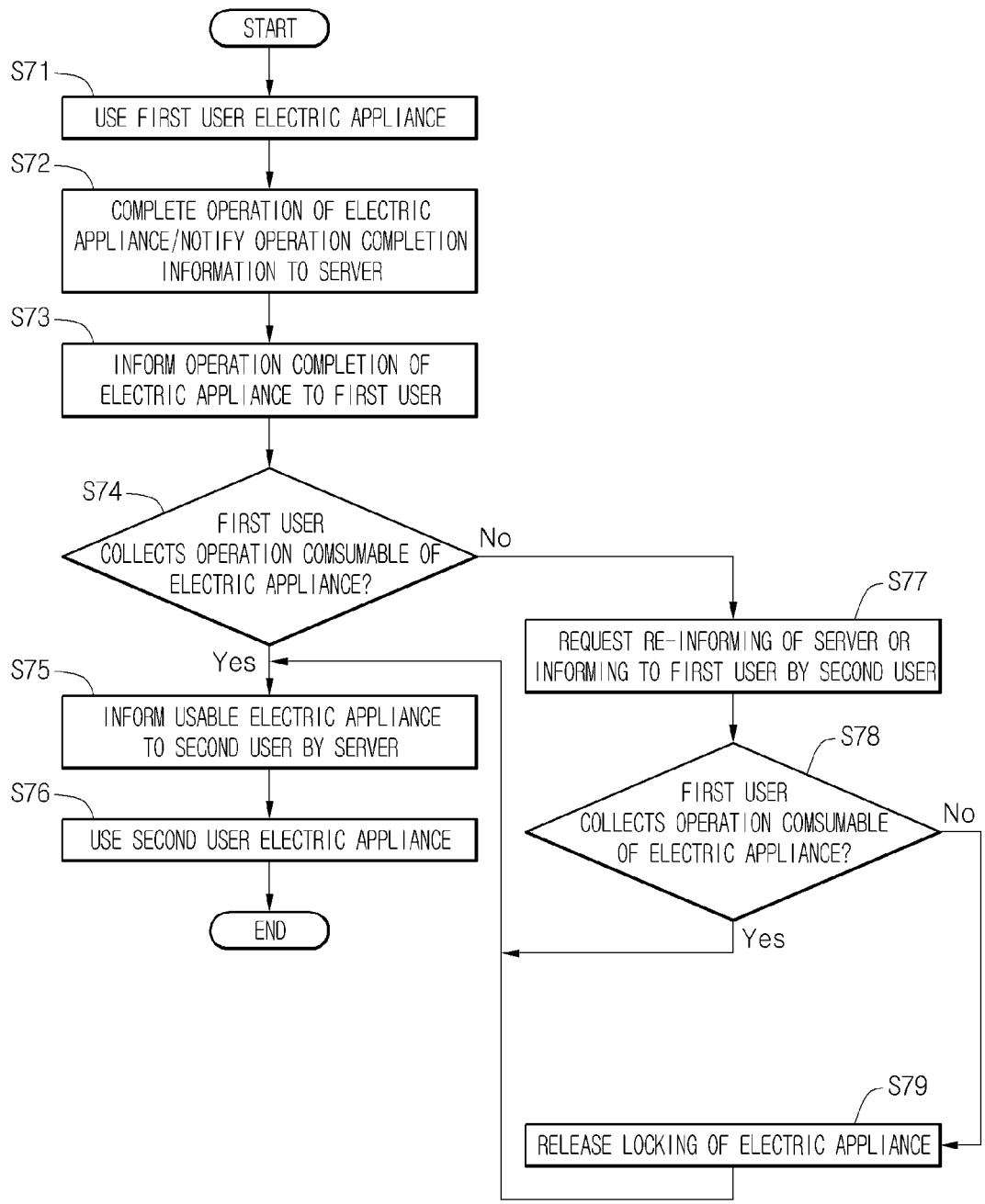
FIG. 13 is a flowchart illustrating a control method when an electric appliance is stopped in operation according to a fifth embodiment of the present invention.

FIG. 13 is a flowchart illustrating a control method when an electric appliance is stopped in operation according to a fifth embodiment of the present invention. A control method according to a fifth embodiment will be described with reference to FIG. 13.

A first user puts a consumable to use (operate) a specific electric appliance. As described above, the first user may connect the first connection device 201 to the sever 400, and then reserve and use the specific electric appliance (S71). When the operation of the specific electric appliance is completed, the product control unit 150 transmits operation completion information to the server 400 through the first communication unit 110 (S72).

Also, the server 400 informs the operation completion of the specific electric appliance to the first user. Here, the server 400 transmits the operation completion information of the electric appliance to the first connection device 201 of the first user. Also, the first connection device 201 may display the operation completion information of the electric appliance through the display unit 224. The display method may include a method using visual elements or acoustic elements.

The server 400 may transmit the operation completion information of the electric appliance to the first connection device 201 several times at a predetermined time interval. The maximum value with respect to the transmission number may be set. Also, the operation completion information of the electric appliance may also be displayed on the electric appliance (S73).

The first user may confirm the operation completion of the electric appliance through the first connection device 210. Thus, the user may visit the used place 20 to collect the operation consumable (hereinafter, referred to as a "consumable") managed or processed by the electric appliance. Until the first user collection the consumable, the electric appliance may be in a locked state so that manipulation thereof is limited. The first user may input the user identification information to release the locked state. When the locked state is released, it may be recognized that the consumable is collected. However, if the consumable is not collected within a set time after the operation of the electric appliance is completed, the locked state may be released. Then, a posterior user may use the electric appliance through a predetermined procedure.

When the first user collects the consumable, the sever notifies usefulness of the electric appliance to the second user. Here, the second user may be the posterior user that previously reserves the same electric appliance. A method of reserving the electric appliance by the second user will be derived from that according to the first embodiment (S74 and S75).

Here, the second user may put the consumable to use or operate the electric appliance (S76). When the first user does not collect the consumable in the operation S74, the server 400 may notify the operation completion information of the electric appliance to the first user again. Alternatively, the server 400 may notify that the first user does not collect the consumable to the second user. The second user may command the re-notification of the operation completion information into the first user to the server 400. Also, the server 400 may re-notify the operation completion information to the first user according to the command of the second user. However, the second user may give up use of the corresponding electric appliance to request operation information with respect to the other electric appliance on the basis of the notification of the server 400. Also, the second user may use the other electric appliance according to the information transmitted from the server 400. For example, the user may reserve or use an electric appliance that is not used at the present (S77).

After the server 400 performs the re-notification to the first user, the first user may collect the consumable of the electric appliance to perform operation following the operation S75. On the other hand, in spite of this process, if the first user does not collect the consumable within a preset time, locking of the corresponding electric appliance may be released to perform the operation following the operation S75. That is, it may be controlled so that the posterior user may forcibly use the corresponding electric appliance. The posterior user may take the consumable of the anterior user out to put own consumable, thereby operating the electric appliance (S78 and S79).

Figure 14:
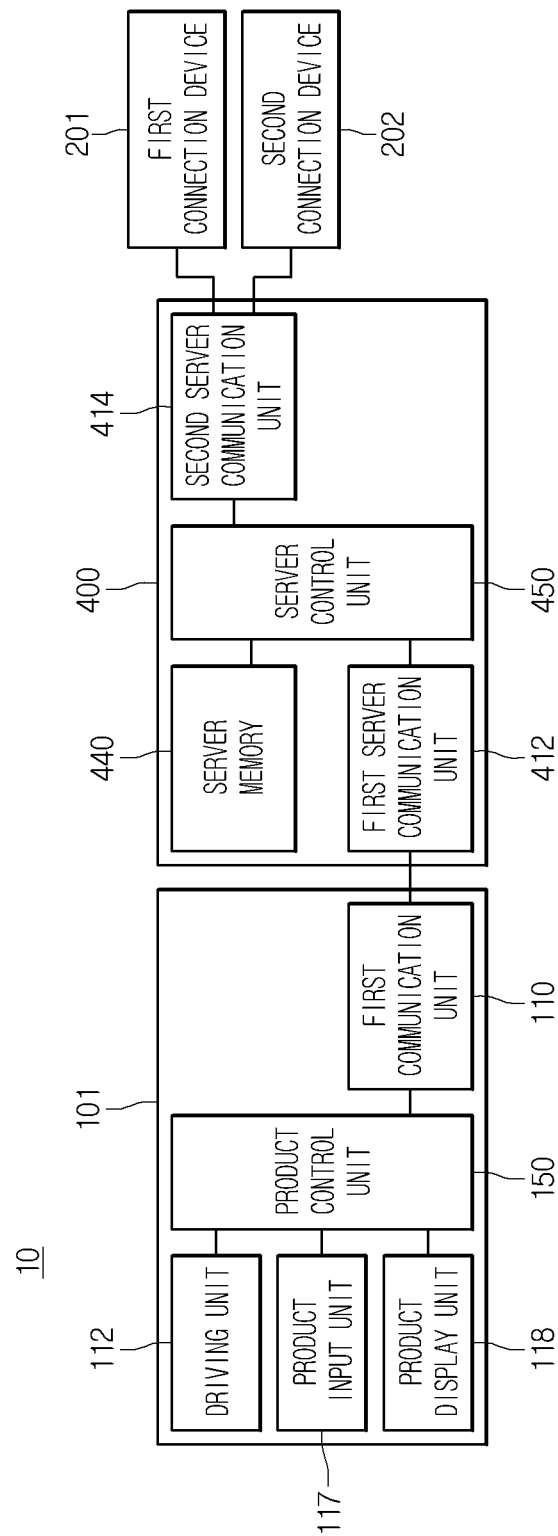
FIG. 14 is a schematic block diagram of a network system according to a sixth embodiment of the present invention.
Figure 15:
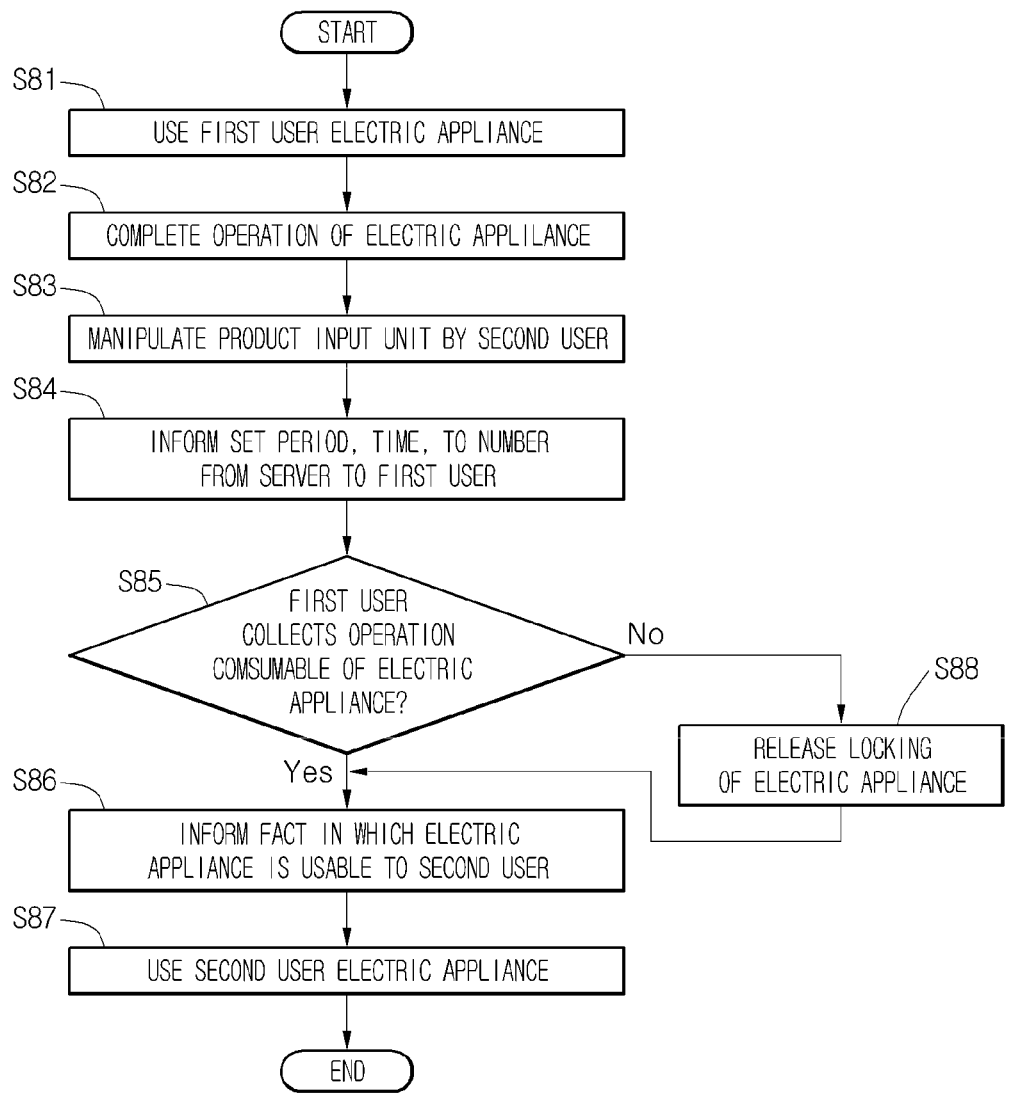
FIG. 15 is a flowchart illustrating a control method when an electric appliance is stopped in operation according to a sixth embodiment of the present invention.

Hereinafter, a sixth embodiment of the present invention will be described. Thus, in related to the current embodiment, the same part as that in the third embodiment will be derived from the descriptions and reference numerals in the fifth embodiment. FIG. 14 is a schematic block diagram of a network system according to a sixth embodiment of the present invention, and FIG. 15 is a flowchart illustrating a control method when an electric appliance is stopped in operation according to a sixth embodiment of the present invention.

Referring to FIG. 14, a network system 101 according to a sixth embodiment of the present invention includes an electric appliance 101 for managing or processing a predetermined consumable, a sever 400 communicably connected to the electric appliance 101 to store information with respect to an operation of the electric appliance 101, and a plurality of connection devices 201 and 202 communicably connected to the server 400. The plurality of connection devices 201 and 202 include a first connection device 201 manipulated by one user to connect the first connection device 201 to the server 400 and a second connection device 202 manipulated by the other user to connect the second connection device 202 to the server 400.

In detail, the electric appliance 101 includes a driving unit 112 driven to perform a function of the electric appliance, a first communication unit 110 transmitting information with respect to an operation of the electric appliance 101 to the outside, a product control unit 150 controlling an operation of the electric appliance 101, a product display part 118 for displaying the operation state of the electric appliance 101, and a product control unit 150 for controlling the operation of the electric appliance. Descriptions with respect to the guide devices 201 and 202 will be derived from those of the third embodiment.

According to the current embodiment, when use of the electric appliance of the anterior user using the first connection device 201 is completed, the posterior user using the second connection device 202 may perform manipulation for informing the operation completion. Hereinafter, the above-described process will be described with reference to the accompanying drawings. A control method when the operation of the electric appliance is completed will be described with reference to FIG. 15.

A first user puts a specific consumable to operate an electric appliance 101. Then, when an operation according to a set course is completed, the operation of the electric appliance 101 may be completed (S81 and S82). When the operation of the electric appliance 101 is completed, operation completion information of the electric appliance is displayed. Also, the operation completion information of the electric appliance 101 is transmitted into the second connection device 202 through the server 400.

The second user that is the posterior user after the first user may manipulate the product input unit 117 of the electric appliance 101 on the basis of the information displayed on the product display unit 118 or the information transmitted from the second connection device 202. The product input unit 117 includes an input part for requesting the operation completion information of the electric appliance to the first user (S83).

When the second user manipulates the product input unit 117, a product operation completion information (hereinafter, referred to as "completion information) according to a preset method. That is, the completion information may be transmitted into the first connection device 210. The preset method may include a transmission time or method of the information transmitted into the first connection device 201. For example, when the second user manipulates the product input unit 117, the completion information may be transmitted by a preset number. For example, the preset number may be three times. Also, when the information transmission is performed several times, a transmission interval between transmitted messages may be set. For example, the transmission time may be about one minute.

A maximum value of the number transmitted into the first user may be previously set. Thus, even though the second user manipulates the product input unit 117 several times, the transmission number of the completion information may be performed by the set maximum value. In summary, when the second user manipulates the product input unit 117, the completion information may be transmitted from the server 400 into the second connection device 201 by the set interval, time or number (S84).

After the completion information is transmitted into the first user, it may be recognized whether the first user collects the consumable of the electric appliance. As described above, the electric appliance 101 may be in the locked state just before the first user collects the consumable. The first user may input predetermined identification information to release the locked state, thereby collecting the consumable from the electric appliance 101. When the first user collects the consumable, the fact in which the first user collects the consumable may be notified to the second user. That is, a fact in which the second user can use the electric appliance is notified (S85 and S86). Also, the second user may use the electric appliance 101 (S87).

If the first user does not collect the consumable in the operation S85, the locked state of the electric appliance 101 may be automatically released. The second user may take the consumable of the first user out to put own consumable, thereby operating the electric appliance. Then, operations following the operation S86 may be performed (S88). As described above, when the use of the electric appliance of the anterior user is completed, the use completion information may be transmitted into the anterior user. Thus, use of the electric appliance for the posterior user may be effectively performed.

Figure 16:
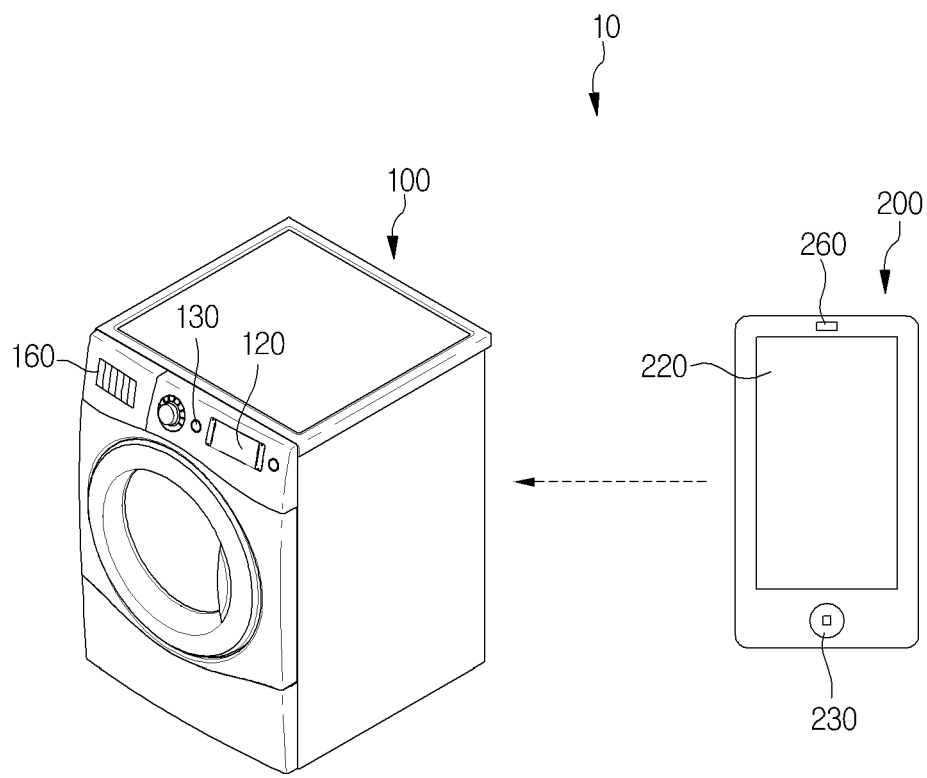
FIG. 16 is a view illustrating constitutions of a remote device and an electric appliance according to a seventh embodiment of the present invention.
Figure 17:
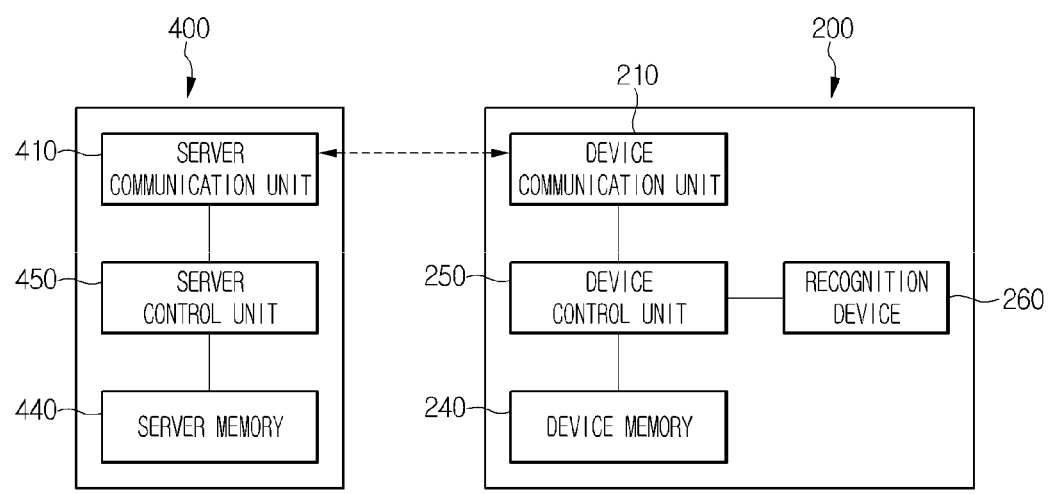
FIG. 17 is a block diagram illustrating constitutions of a management server and the remote device according to the seventh embodiment of the present invention.

FIG. 16 is a view illustrating constitutions of a remote device and an electric appliance according to a seventh embodiment of the present invention, and FIG. 17 is a block diagram illustrating constitutions of a management server and the remote device according to the seventh embodiment of the present invention.

Referring to FIGS. 16 and 17, a network system 10 according to the current embodiment includes an electrical appliance 100 for performing a preset function as one component constituting the network system 10, a remote device 200 for monitoring an operation state of the electric appliance 100 or controlling an operation of the electric appliance as the other component constituting the network system 10, and a server 400 for collecting information of the electric appliance 100 and the remote device 200 to transmit the operation information of the electric appliance 100 into the remote device 200. The remote device 200 may be called a "control device" or a "connection device" as described in the foregoing embodiment in that the remote device 200 is communicably connected to the electrical appliance 100 to monitor or control the operation of the electric appliance 100.

At least one electric appliance 100 may be provided. The at least one electric appliance is connected to the server 400. For example, the electric appliance may include a commercial electric appliance. In this case, the plurality of electric appliances may be understood as products provided in a commercial store, i.e., products that are usable by many and unspecified persons through payment of predetermined cost and acquisition of right. When one user completely uses a washing machine, a posterior user may use the washing machine.

The electric appliance 100 includes a product display unit for displaying operation information of the electric appliance and an input unit 130 for inputting a predetermined command related to the operation of the electric appliance. Also, the electric appliance 100 includes an information display unit 160 in which device information of the electric appliance 100 is contained. The device information may include a product code (serial information) of the electric appliance 100 and communication information (IP information) connected to the server 400. The device information may be previously stored in the server 400. The information display unit 160 may include a bar code or QR code that is a combination of patterns or symbols containing predetermined information.

The remote device 200 may be understood as a device for monitoring the operation state of the electric appliance 100 or controlling the operation of the electric appliance 100 at a position spaced apart from the electric appliance 100. When the electric appliance 100 is a commercial electric appliance, the remote device 200 may be a device provided in the commercial store, i.e., an exclusive product device or a portable terminal (mobile phone) that is portable by the user. The control device 200 may wirelessly communicate with the electrical appliance 100 or the server 400 and be portable by the user.

Also, the remote device 200 includes a device display unit 220 for displaying operation information of the remote device or the operation information of the electric appliance 100, an input unit 230 for inputting a predetermined command to perform a function of the remote device, and a recognition device 260 for recognizing information stored in the information display unit 160. The recognition device 260 may include an imaging device for acquiring an image of the information display unit 160, for example, a camera, a reader for reading appointed information displayed on the information display unit 160, for example, a bar code reader, or a charter recognition device for analyzing charters or symbols displayed on the information display unit 160.

The information of the information display unit 160 recognized from the recognition device 260 may be transmitted into the server 400. The information recognized by the recognition device 260 may be displayed on the device display unit 220. Hereinafter, the remote device and the server 400 will be described with reference to the accompanying drawings.

The remote device 200 may include a device communication unit 210 for communicably connecting the remote device 200 to the management server 300, a device memory 240 for storing information with respect to the remote device 200 or the electric appliance 100, and a device control unit 250 for controlling the above-described constitutions. The device communication unit 210 may be understood as a gateway connected to the server 400. The device communication unit 210 may transmit device information of the electric appliance 100 or information of the remote device 200 to the server 400.

The information of the remote device 200 may include product code information or communication information (IP information) connected to the server 400 as a communication environment. For convenience of the description, the device information with respect to the electric appliance 100 is called "first information", and the information with respect to the remote device 200 is called "second information". The device communication unit 210 may be directly communicably connected to the electric appliance 100.

The device memory 240 may include predetermined information or specific program for connecting the device memory 240 to the server 400, e.g., an application. When the application is executed, the remote device 200 and the server 400 may be communicably connected to each other. For example, the server 400 may be a web server. When the application is executed, the remote device 200 may be connected to the server 400 through Internet.

The server 400 may recognize information related to the operations of the electric appliances 101 and 102. The information related to the operations may include operation information, operation completion information, current state information, or error information of the electric appliance. The server 400 may include a server communication unit 410 communicably connected to the device communication unit 210. The server communication unit 410 may be communicably connected to the electric appliance 100 to recognize the information (the first information or operation information) with respect to the electric appliance 100. Alternatively, the server communication unit 410 may include a separate communication unit connected to each of the device communication unit 210 and the electric appliance 100.

Also, the server 400 may further include a sever memory 440 for storing include the first information or operation information of the electric appliance 100 and second information with respect to the remote device 200. Information in which the first and second information match each other may be stored in the server memory 440. The server 400 may further include a server control unit 450 for controlling the server memory 440 and the server communication unit 410 so that the first and second information match each other, and the operation of the electric appliance 100 is transmitted into the remote device 200.

Figure 18:
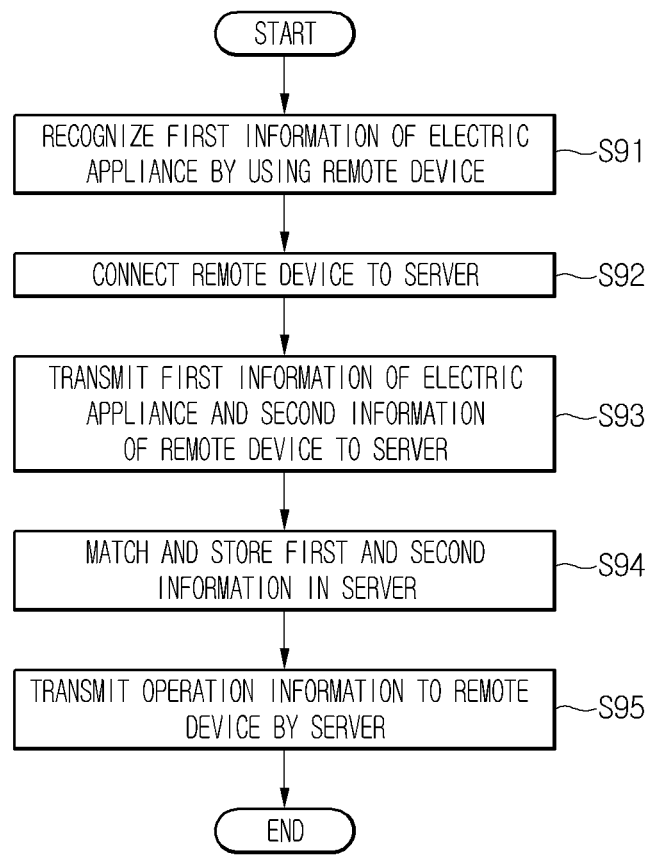
FIG. 18 is a flowchart illustrating a method of monitoring an operation state of an electric appliance from the remote device according to the seventh embodiment of the present invention.

FIG. 18 is a flowchart illustrating a method of monitoring an operation state of an electric appliance from the remote device according to the seventh embodiment of the present invention. A method of matching the information of the remote device 200 and the information of the electric appliance 100 and a method of monitoring the operation of the electric appliance 100 will be described with reference to FIG. 18.

First, the first information of the electric appliance 100 is recognized by using the remote device 200. In detail, the information displayed on the information display unit 160 is recognized through the recognition device 260. When the recognition device 260 is the imaging device, the information included in the information display unit 160 may be acquired as an image. On the other hand, when the recognition device 200 is the information reader, characters, symbols, or a combination thereof which are included in the information display unit 160 may be recognized. Through the above-described process, the first information with respect to the device information of the electric appliance 100 may be recognized (S91).

The remote device 200 may be connected to the server 400. Here, the device communication unit 210 and the sever communication unit 410 may be communicably connected to each other. For example, when the server 400 is the web server, if the application stored in the remote device 200 is executed, the server 400 and the remote device 200 may be communicably connected to each other (S92). Also, the information stored in or recognized by the remote device may be transmitted into the server 400. The information transmitted into the server 400 may include the first information with respect to the device information of the electric appliance 100 and the second information with respect to the device information of the remote device 200 (S93).

The server 400 receiving (inputting) the first and second information from the remote device 200 may match the first and second information with each other. Also, the matched information may be stored in the server memory 440 (S94). When the first and second information match each other, the remote device 200 may be recognized as a device which monitors the operation state of the electric appliance 100 or controls the operation of the electric appliance 100. The server 400 may recognize the operation information or the operation completion information of the electric appliance 100. The operation information includes an operation course, an operation time, or a remaining time. Also, the server 400 may transmit the operation information of the electric appliance 100 into the remote device 200.

The remote device 200 may monitor the electric appliance 100 through the operation information transmitted from the server 400 to control the electric appliance 100, e.g., perform pause or stop of the electric appliance 100. When the operation of the electric appliance 100 is controlled through the remote device 200, a predetermined command inputted into the remote device 200 may be transmitted into the electric appliance 100 through the server 400, and thus the electric appliance 100 may be controlled to correspond to the predetermined command. As described above, since the remote device 200 may perform the operation monitoring or operation controlling of the electric appliance 100 through the server 400, the remote device 200 may be effectively used even through direct communication between the remote device 200 and the electric appliance 100 is limited (S95)

Hereinafter, a method of matching the information of the commercial electric appliance and the remote device and a method of monitoring the electric appliance by using the remote device according to various embodiments of the present invention will be described. The common technology idea with respect to the current embodiment will be derived from the foregoing embodiments.

Figure 19:
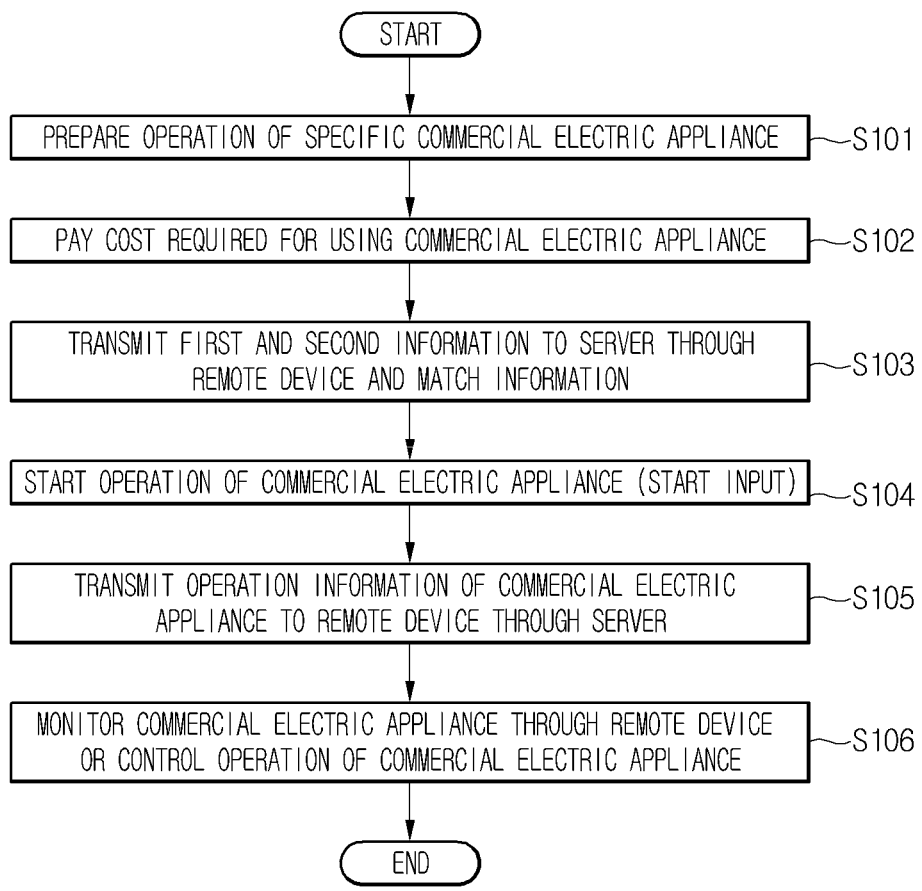
FIG. 19 is a flowchart illustrating a method of monitoring an operation state of a commercial electric appliance according to the seventh embodiment of the present invention.

FIG. 19 is a flowchart illustrating a method of monitoring an operation state of a commercial electric appliance according to the seventh embodiment of the present invention. Referring to FIG. 19, a control method according to the seventh embodiment will be described.

A specific commercial electric appliance provided in the commercial store may be prepared in operation. For example, when the electric appliance is the washing machine, laundry may be put into the electric appliance (S101). Also, a cost required for using the electric appliance may be paid. The cost payment method may include cash, credit card, or account transfer. When the cash is selected as the cost payment method, the user may throw predetermined cash into the electric appliance. If the thrown cash lacks, a message for requesting an additional throw of cash may be displayed. When the when the account transfer or the credit card is selected as the cost payment method, predetermined payment information may be inputted through the remote device 200. The inputted payment information may be transmitted into the server 400. Then, when it is recognized that the inputted information is accurate information, the electric appliance 100 may be converted into a usable state (S102).

The first and second information may be transmitted through the remote device 200, and the server 400 may match the transmitted first and second information with each other (S103). The operation of the commercial electric appliance 100 may start. For example, a start command may be inputted through the input unit 130 provided in the electric appliance 100 or the input unit 230 of the remote device 200. When the start command is inputted into the input unit 230, the start command may be transmitted into the server 400. Then, the server 400 may control the staring operation of the corresponding electric appliance 100 on the basis of the matched first and second information (S104).

While the electric appliance 100 operates, the operation information or the operation completion information of the electric appliance 100 may be transmitted into the remote device 200. Thus, the remote device 200 may monitor or control the operation of the electric appliance 100. When the operation of the electric appliance 100 is controlled through the remote device 200, a predetermined command inputted into the remote device 200 may be transmitted into the electric appliance 100 through the server 400 (S105 and S106).

Another embodiment will be proposed. Although the first and second information match each other in the server 400 in the foregoing embodiments, the present invention is not limited thereto. For example, after the operation of the electric appliance 100 starts, the first and second information may be transmitted from the remote device 200 to the server 400 to match the first and second information with each other.

Figure 20:
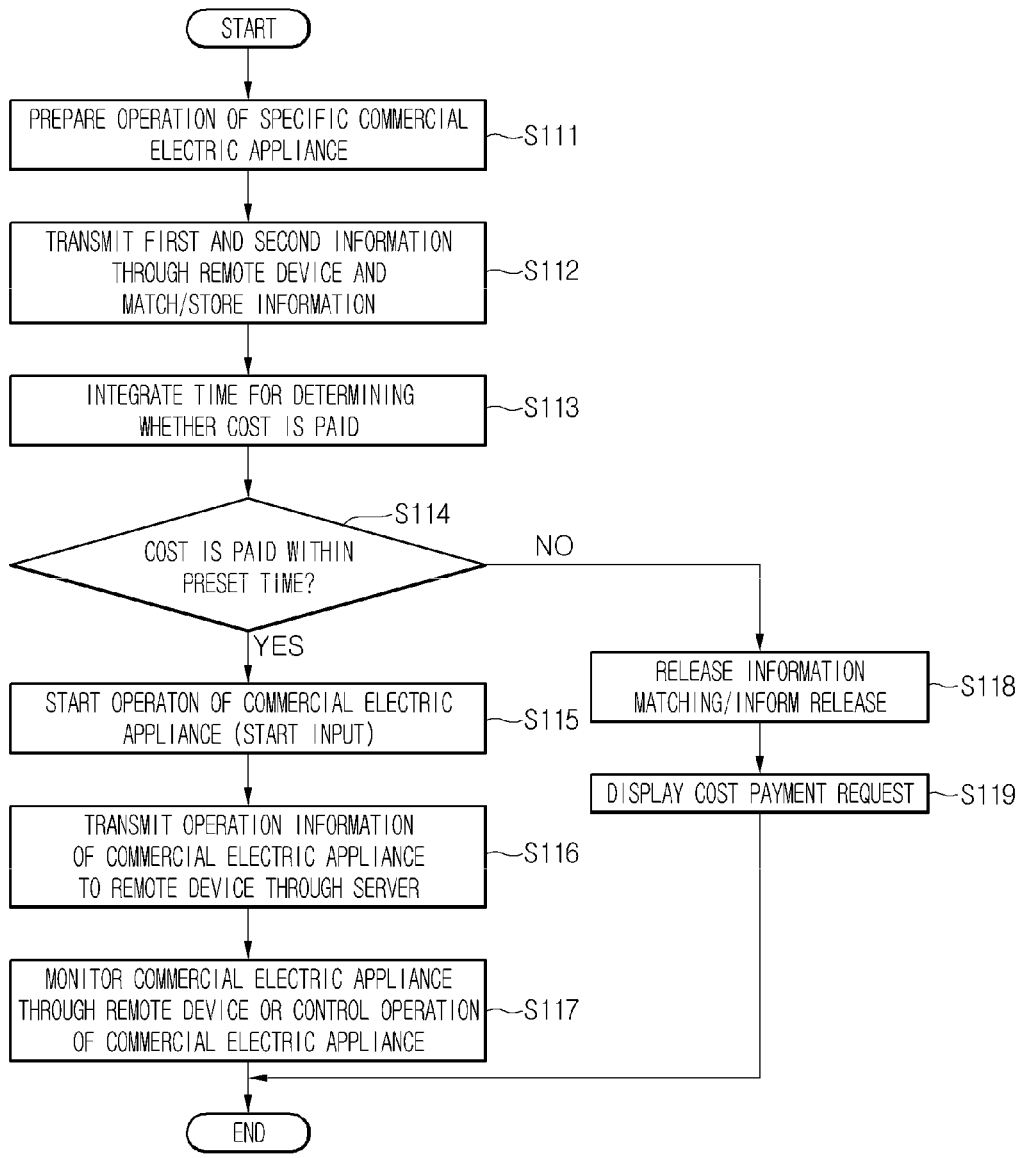
FIG. 20 is a flowchart illustrating a method of monitoring an operation state of a commercial electric appliance according to an eighth embodiment of the present invention.

FIG. 20 is a flowchart illustrating a method of monitoring an operation state of a commercial electric appliance according to an eighth embodiment of the present invention. A control method according to an eighth embodiment will be described with reference to FIG. 20.

A specific commercial electric appliance to be used by a user is prepared in operation, and then first and second information are transmitted into a server 400 through a remote device 200. The server 400 may match or store the received first and second information (S111 and S112). Also, it is determined whether cost is paid as a precondition for using the electric appliance 100. In detail, whether the cost is paid may be determined through the electric appliance 100 or the remote device 200. For this, an elapsed time may be integrated (S113).

When the cost is paid within a preset time, an operation of the electric appliance 100 may start. Also, the server 400 may transmit operation information of the electric appliance 100 into the remote device. Then, the user may monitor or control the operation of the electric appliance 100 through the remote device 200 (S115, S116, and S117). On the other hand, if the cost is not paid within the preset time in the operation 5114, the server 400 may release the matching of the first and second information to inform the release of the information matching. The informing of the matching release may be performed through a product display unit 120 or the device display unit 220 (S118).

Also, a message (an image or sound) for requesting the cost payment may be displayed through the product display unit 120 or the device display unit 220. As described above, since whether the electric appliance is usable due to the cost payment is feedbacked to the user, user's convenience may be improved to stabilize the system (S119).

Figure 21:
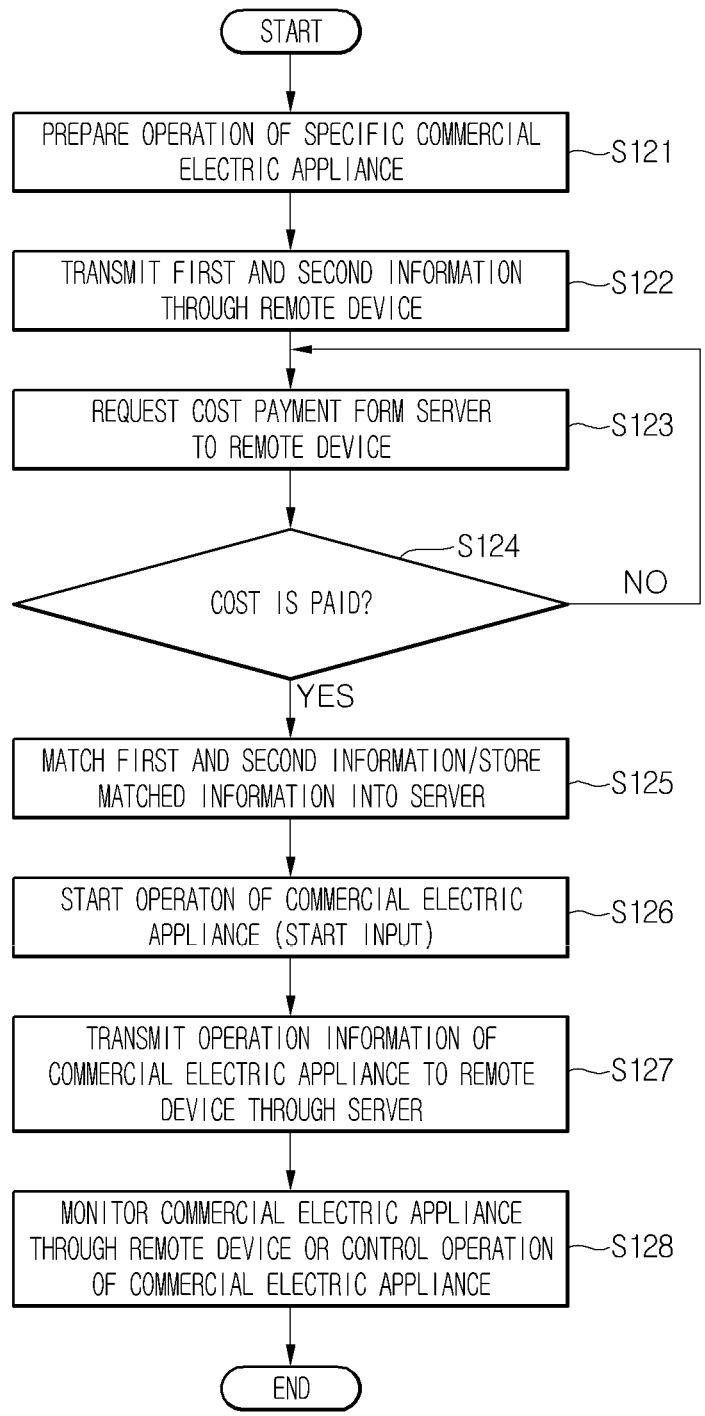
FIG. 21 is a flowchart illustrating a method of monitoring an operation state of a commercial electric appliance according to a ninth embodiment of the present invention.

FIG. 21 is a flowchart illustrating a method of monitoring an operation state of a commercial electric appliance according to a ninth embodiment of the present invention. A control method according to a ninth embodiment will be described with reference to FIG. 21.

A specific commercial electric appliance to be used by a user is prepared in operation, and then first and second information are transmitted into a server 400 through a remote device 200 (S121 and S122). Also, the cost payment for using the electric appliance 100 is requested. The cost payment request may be performed through the product display unit 120 or the device display unit 220 (S123). When the cost is paid, the first and second information matched in the server 400 may be stored in the server memory 440. However, if the cost is not paid, the cost payment request state may be maintained (S125).

Also, an operation of the electric appliance 100 may start. Also, the server memory 400 may transmit operation information of the electric appliance 100 into the remote device. Then, the user may monitor or control the operation of the electric appliance 100 through the remote device 200. As described above, since the operation of the electric appliance starts after the cost is paid, the reliability of the system may be improved (S126, S127, and S128).

Figure 22:
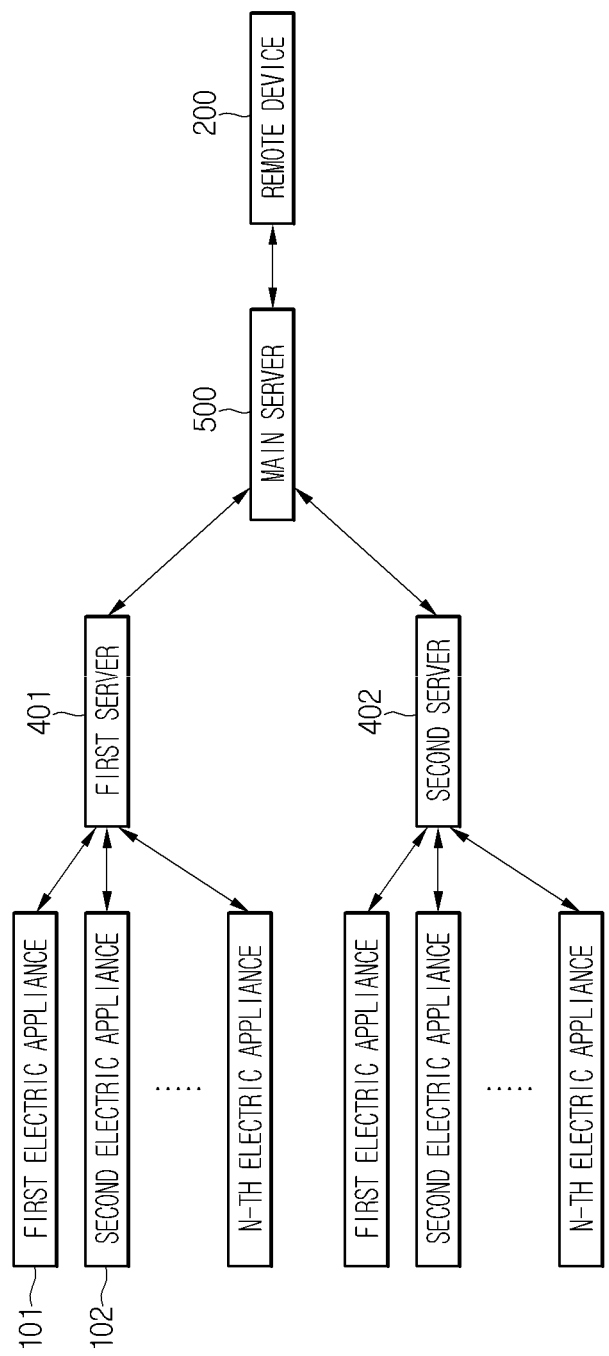
FIG. 22 is a schematic block diagram of a network system according to a tenth embodiment of the present invention.

FIG. 22 is a schematic block diagram of a network system according to a tenth embodiment of the present invention.

Referring to FIG. 22, a network system according to a tenth embodiment of the present invention includes at least one electric appliance 101 and 102, first and second servers 401 and 402 for managing the electric appliances 101 and 102, a main server 500 for integrally managing the first and second servers 401 and 402, and a remote device 200 communicably connected to the main server 500.

The first and second servers 401 and 402 may respectively manage the electric appliances. Also, each of the first and second servers 401 and 402 may recognize operation information, operation completion information, current state information, or error information of the corresponding electric appliance. Also, the main server 500 may collect each of information recognized by the first and second servers 401 and 402 to manage and control the operation states of all electric appliances.

The remote device 200 may be communicably connected to the main server 500 by executing an application to transmit first information with respect to the electric appliance 100 and second information with respect to the remote device 200 into the main server 500. Also, the operation information of the electric appliance may be received from the main server 500 to monitor or control the operation of the electric appliance 100.

INDUSTRIAL APPLICABILITY

According to the present invention, since the commercial electric appliance is monitored or controlled by using the control device, the user's convenience may be improved, and thus, industrial applicability may be remarkable.

The invention claimed is:

1. A network system comprising:
   a commercial electric appliance comprising a cost system for an operation thereof;
   a control device communicably connected to the commercial electric appliance wherein the control device comprises and comprising a display unit configured to remotely monitor operation information of the commercial electric appliance; and
   a server communicably connected to the commercial electric appliance and the control device,
   wherein a first input of user identification information is required in the control device or the commercial electric appliance to operate the commercial electric appliance using the control device,
   if the first input of the user identification information is performed, information with respect to a plurality of electric appliances to be usable are received by the control device, the information with respect to the plurality of electric appliances including information with respect to a currently usable electric appliance and a currently unusable electric appliance,
   the control device performs reservation with respect to use of the commercial electric appliance in the state where the control device is communicably connected to the server, and
   a second input of the user identification information is required to use the commercial electric appliance after the reservation is completed, and if the second input of the user identification information is not performed within a preset time, the reservation is cancelled to prevent performing reservation without using the commercial electric appliance; and
   transmitting information in which the commercial electric appliance is usable into a second user if the consumables are collected by the first user,
   wherein the second user is a posterior user that previously reserved the commercial electric appliance.

2. The network system according to claim 1, wherein the control device comprises a control unit configured to remotely control an operation of the commercial electric appliance.

3. The network system according to claim 1, wherein the user identification information is inputted when a locking release or a door open of the commercial electric appliance are determined at an operation start time, an operating time, or an operation completion time.

4. The network system according to claim 1, wherein the user identification information comprises a user ID or password and is changeable.

5. The network system according to claim 1, wherein a cost payment method is set in the cost system, and
   the cost payment method comprises a cash, account transfer, or credit card payment method.

6. The network system according to claim 1, wherein the commercial electric appliance comprises an openable door, and
   an end mode with respect to an open of the door after the operation of the commercial electric appliance is completed is defined in the commercial electric appliance or the control device.

7. The network system according to claim 6, wherein the end mode comprises at least one of a first mode in which locking of the door is released after the operation of the commercial electric appliance is completed and a second mode in which only a corresponding user of the commercial electric appliance releases the locking of the door.

8. The network system according to claim 7, wherein, in a state where the second mode is set, if the locking of the door is not released after the operation of the commercial electric appliance is completed, payment of an additional cost required for opening the door is required.

9. The network system according to claim 1, wherein information with respect to the operation of the commercial electric appliance comprises information with respect to whether the commercial electric appliance operates or information with respect to a remaining operation time.

10. The network system according to claim 1, wherein, when the commercial electric appliance is not reserved or is unusable in a preset time band, reservation standby is set by using the control device.

11. The network system according to claim 1, further comprising a used place in which the commercial electric appliance is provided,
wherein an input of each of a first condition for selecting the used place and a second condition with respect to the commercial electric appliance is possible.

12. The network system according to claim 11, wherein the first condition comprises a condition with respect to whether the used place is disposed within a preset distance or whether a preset electric appliance is provided in the used place, and
the second condition comprises conditions with respect to a kind, size, capacity, or use cost of the commercial electric appliance.

13. The network system according to claim 1, wherein the control device comprises:
a first control device provided in an anterior user for using the commercial electric appliance; and
a second control device provided in a posterior user for using the commercial electric appliance.

14. The network system according to claim 13, wherein, when an operation of the commercial electric appliance by the anterior user is completed, operation completion information is transmitted into the first control device.

15. The network system according to claim 14, wherein a locked state of the commercial electric appliance is maintained until the user identification information is inputted after the operation completion information is transmitted into the first control device, and
if the user identification information is not inputted within a preset time, the locked state is released.

16. The network system according to claim 14, wherein the operation completion information is transmitted several times at a preset time interval.

17. The network system according to claim 13, wherein, when the operation of the commercial electric appliance by the anterior user is completed, information for informing that the commercial electric appliance is usable is transmitted into the second control device.

18. The network system according to claim 17, wherein the usable state of the commercial electric appliance is a state in which a first user collects consumables to be managed or processed from the commercial electric appliance.

19. A method of controlling a network system, the method comprising:
communicably connecting a commercial electric appliance to a control device;
paying a cost required for using the commercial electric appliance;
setting user identification information to the commercial electric appliance or the control device; and
displaying information with respect to an operation of the commercial electric appliance on the control device,
wherein a server connected to the control device and the commercial electric appliance is further provided,
wherein a first input of the user identification information is required in the control device or the commercial electric appliance to operate the commercial electric appliance using the control device;
if the first input of the user identification information is performed, information with respect to a plurality of electric appliances to be usable are received by the control device, the information with respect to the plurality of electric appliances including information with respect to a currently usable electric appliance and a currently unusable electric appliance; and the method further comprises:
connecting the control device to the server;
recognizing whether a product matching a preset condition among the commercial electric appliances exists;
performing reservation in which a first user uses the corresponding electric appliance if the product matching the preset condition exists;
transmitting operation completion information into the first user when an operation of the commercial electric appliance for the first user is completed;
recognizing whether consumables to be managed or processed by the commercial electric appliance are collected by the first user; and
transmitting information in which the commercial electric appliance is usable into a second user if the consumables are collected by the first user, wherein the second user is a posterior user that previously reserved the commercial electric appliance.

20. The method according to claim 19, further comprising inputting the user identification information at an operation start time, operating, or operation completion time of the commercial electric appliance to confirm an operation state of the commercial electric appliance or control an operation of the commercial electric appliance.

21. The method according to claim 19, wherein the commercial electric appliance comprises a commercial washing machine, dryer, refrigerator, or cooker which comprises a door, and
after the operation of the commercial electric appliance is completed, the method further comprises setting an end mode with respect to whether the door is openable.

22. The method according to claim 19, wherein the preset condition comprises at least one of whether a commercial electric appliance usable at the present or in a time band to be used exists and information with respect to the electric appliance itself.

23. The method according to claim 19, further comprising:
inputting user identification information into the commercial electric appliance after the reservation is completed; and
converting the commercial electric appliance in an operable state when the user identification information is inputted,
wherein, if the user identification information is not inputted into the commercial electric appliance, the reservation is cancelled.

24. The method according to claim 19, further comprising:
transmitting first information with respect to the electric appliance and second information with respect to the control device into the server;
matching the first and second information with each other; and transmitting information with respect to an operation of the electric appliance into the server on the basis of the matched first and second information.

25. The method according to claim 24, wherein the recognizing of the first information and the matching of the first and second information are performed after a cost required for using the corresponding electric appliance is paid.

26. The method according to claim 24, wherein the operation of the electric appliance is performed after the paying of the cost, and the recognizing of the first information and the matching of the first and second information are performed after the electric appliance operates.

27. The method according to claim 24, wherein the recognizing of the first information and the matching of the first and second information is performed before the paying of the cost, and the method further comprises releasing the matching of the first and second information if the cost is not paid within a preset time.

28. The method according to claim 24, further comprising:
requesting cost payment after the first and second information are transmitted into the server; and
matching the first and second information or storing the matched information when the cost payment is completed.

29. The method according to claim 24, wherein the recognizing of the first information comprises imaging or reading information displayed on the electric appliance.

30. The method according to claim 24, wherein the first or second information comprises product code information with respect to the electric appliance or the control device or communication information connected to the management server.

* * * * *